(12) United States Patent
Thomson

(10) Patent No.: US 11,729,312 B2
(45) Date of Patent: *Aug. 15, 2023

(54) HEARING ACCOMMODATION

(71) Applicant: Sorenson IP Holdings, LLC, Salt Lake City, UT (US)

(72) Inventor: David Thomson, Bountiful, UT (US)

(73) Assignee: Sorenson IP Holdings, LLC, Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/449,634

(22) Filed: Sep. 30, 2021

(65) Prior Publication Data

US 2022/0103682 A1    Mar. 31, 2022

Related U.S. Application Data

(63) Continuation of application No. 16/814,767, filed on Mar. 10, 2020, now Pat. No. 11,140,264.

(51) Int. Cl.
| | |
|---|---|
| *H04M 1/72475* | (2021.01) |
| *H04M 3/42* | (2006.01) |
| *H04M 1/247* | (2021.01) |
| *G10L 15/22* | (2006.01) |
| *G10L 25/51* | (2013.01) |
| *G10L 15/26* | (2006.01) |

(52) U.S. Cl.
CPC ......... *H04M 3/42391* (2013.01); *G10L 15/22* (2013.01); *G10L 15/26* (2013.01); *G10L 25/51* (2013.01); *H04M 1/2475* (2013.01); *H04M 1/72475* (2021.01); *H04M 2201/18* (2013.01); *H04M 2201/38* (2013.01); *H04M 2201/40* (2013.01); *H04M 2201/42* (2013.01)

(58) Field of Classification Search
None
See application file for complete search history.

(56) References Cited

U.S. PATENT DOCUMENTS

| | | | |
|---|---|---|---|
| 7,483,831 B2 | 1/2009 | Rankovic | |
| 10,038,783 B2 | 7/2018 | Wilcox et al. | |
| 10,250,846 B2 | 4/2019 | Chiang | |
| 11,140,264 B1* | 10/2021 | Thomson | H04M 1/72475 |
| 2002/0161578 A1* | 10/2002 | Saindon | G06F 40/58 |
| | | | 704/235 |
| 2005/0004796 A1 | 1/2005 | Trump et al. | |
| 2005/0207586 A1 | 9/2005 | Lin et al. | |
| 2008/0086301 A1 | 4/2008 | Tachibana | |
| 2008/0228473 A1 | 9/2008 | Kinoshita | |

(Continued)

*Primary Examiner* — Quoc D Tran
(74) *Attorney, Agent, or Firm* — Maschoff Brennan

(57) ABSTRACT

A method may include obtaining a first audio signal including first speech originating at a remote device during a communication session between the remote device and a communication device and obtaining a second audio signal including second speech originating at the communication device during the communication session between the remote device and the communication device. The method may also include obtaining a characteristic of the communication session from one or more of: the first audio signal, the second audio signal, and settings of the communication device and determining a hearing level of a user of the communication device using the characteristic of the communication session.

17 Claims, 11 Drawing Sheets

(56) References Cited

U.S. PATENT DOCUMENTS

| | | | |
|---|---|---|---|
| 2008/0254753 A1* | 10/2008 | Steenstra | H04R 5/04 |
| | | | 455/39 |
| 2012/0329518 A1 | 12/2012 | Garg | |
| 2014/0018045 A1* | 1/2014 | Tucker | H04W 4/12 |
| | | | 455/414.1 |
| 2017/0230752 A1* | 8/2017 | Dohmen | H04R 1/1091 |
| 2019/0156847 A1 | 5/2019 | Bryan et al. | |

* cited by examiner

HEARING ACCOMMODATION

CROSS-REFERENCE TO RELATED APPLICATION

This application is a continuation of U.S. patent application Ser. No. 16/814,767, filed on Mar. 10, 2020, the disclosure of which is incorporated herein by reference in its entirety.

FIELD

The embodiments discussed herein are related to hearing accommodation.

BACKGROUND

Audio communications may be performed using different types of devices. In some instances, people that are hard-of-hearing or deaf may need assistance to participate in the audio communications. In these instances, transcriptions of the audio may be provided to the hard-of-hearing or deaf. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method may include obtaining a first audio signal including first speech originating at a remote device during a communication session between the remote device and a communication device and obtaining a second audio signal including second speech originating at the communication device during the communication session between the remote device and the communication device. The method may also include obtaining a characteristic of the communication session from one or more of: the first audio signal, the second audio signal, and settings of the communication device and determining a hearing level of a user of the communication device using the characteristic of the communication session.

BRIEF DESCRIPTION OF THE DRAWINGS

Example embodiments will be described and explained with additional specificity and detail through the use of the accompanying drawings in which.

DESCRIPTION OF EMBODIMENTS

People with reduced levels of hearing may have difficultly participating in communication sessions, such as telephone calls or cellular calls. For example, people with reduced levels of hearing may have difficulty understanding what is said by another person during communication sessions. People with reduced levels of hearing may use different levels of hearing accommodation to assist them to understand others during communication sessions. For example, enhancing audio during a communication session may be sufficient for a person with a first hearing level to increase their understanding during the communication session. In contrast, for a person with a second hearing level, transcriptions of audio of the communication session presented in real-time with the audio may be used to increase their understanding during the communication session.

Some embodiments in this disclosure describe systems and methods that may be used to determine a hearing level of a person. Based on the hearing level of the person, the systems and methods may select a particular type of hearing accommodation for the person. For example, the systems and methods may use information, such as speech characteristics of the person, settings of a device, how a third-party on a communication session interacts with the person, user characteristics, among other data to make an initial determination of a hearing level loss of a person. Based on the initial determination, the systems and methods may select one or more hearing accommodation settings to adjust. Some of the settings may include audio enhancement of the communication session presented to the person, audio presentation with human mouth images that mimic speaking the speech of the audio, presentation of a transcription of the audio, presentation of a summary of transcriptions of the audio, among other settings. Alternately or additionally, the systems and methods may administer an additional hearing level test or make additional suggestions to a person based on the initial determination of hearing level of the person.

The systems and methods described in this disclosure may thus provide new and improved systems and methods to determine a hearing level of a person and how to accommodate the hearing level of the person. Furthermore, the systems and methods described in this disclosure may improve technology with respect to audio communications, hearing accommodation, and devices used to participate in communication sessions.

Figure 1:
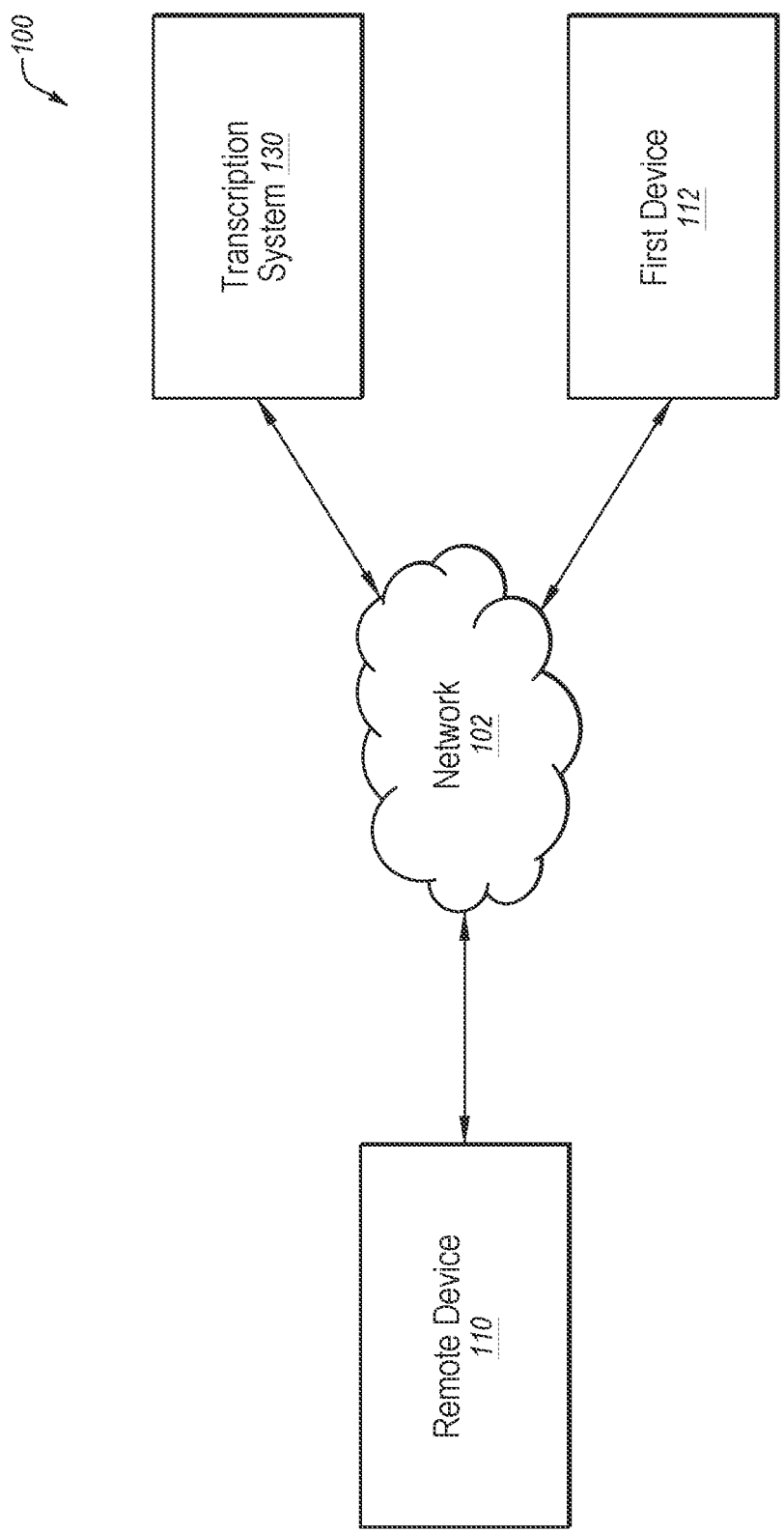
FIG. 1 illustrates an example environment for hearing accommodation.

Turning to the figures, FIG. 1 illustrates an example environment 100 for hearing accommodation. The environment 100 may be arranged in accordance with at least one embodiment described in the present disclosure. The environment 100 may include a network 102, a remote device 110, a first device 112, and a transcription system 130.

The network 102 may be configured to communicatively couple the remote device 110 and the first device 112. The network may also be configured to communicatively couple the first device 112 and the transcription system 130. Alternately or additionally, the network may also be configured to communicatively couple the remote device 110 and the transcription system 130. In some embodiments, the network 102 may include any short-range wireless network, such as a wireless local area network (WLAN), a personal area network (PAN), or a wireless mesh network (WMN). For example, the network 102 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, Digital Enhanced Cordless Telecommunications (DECT) networks, among other types of LANS, PANS, and WMNS.

In some embodiments, the network 102 may include cellular communication networks for sending and receiving communications and/or data including via hypertext transfer protocol (HTTP), direct data connection, wireless application protocol (WAP), etc. The network 102 may also include a mobile data network that may include third-generation (3G), fourth-generation (4G), fifth-generation (5G), long-term evolution (LTE), long-term evolution advanced (LTE-A), Voice-over-LTE ("VoLTE") or any other mobile data network or combination of mobile data networks. In these or other embodiments, the network may include any combination of analog, digital, and/or optical networks that form a network, including an Internet Protocol (IP) based network and a public switched telephone network (PSTN). In these and other embodiments, the portions of the network 102 that communicatively couple any one of the remote device 110, the first device 112, and the transcription system 130 to any other of the remote device 110, the first device 112, and the transcription system 130 may include one or more of the network types described above, among other types of networks.

Each of the remote device 110 and the first device 112 may be any electronic or digital computing device. For example, each of the remote device 110 and the first device 112 may include a desktop computer, a laptop computer, a smartphone, a mobile phone, a tablet computer, a smart watch, a smart device, a smart speaker, smart television, a telephone, a phone console, a caption device, a captioning telephone, or any other computing device or combination of aforementioned or others computing devices that may be used for communication between users of the remote device 110 and the first device 112.

In some embodiments, each of the remote device 110 and the first device 112 may include memory and at least one processor, which are configured to perform operations as described in this disclosure, among other operations. In some embodiments, each of the remote device 110 and the first device 112 may include computer-readable instructions that are configured to be executed by each of the remote device 110 and the first device 112, respectively, to perform operations described in this disclosure.

In some embodiments, each of the remote device 110 and the first device 112 may be configured to establish communication sessions with other devices. For example, each of the remote device 110 and the first device 112 may be configured to establish an outgoing communication session, such as an audio call, video call, or other communication session, with another device over a telephone line or other network, such as a portion of the network 102. For example, each of remote device 110 and the first device 112 may communicate over a wireless cellular network, a wired Ethernet network, an optical network, and/or a POTS line.

In some embodiments, each of the remote device 110 and the first device 112 may be configured to obtain audio during a communication session. The audio may be part of a audio communication, such as a telephone call or video communication. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the remote device 110 may be configured to obtain first audio from a first user. For example, the remote device 110 may obtain the first audio from a microphone of the remote device 110 or from another device that is communicatively coupled to the remote device 110. The remote device 110 may be configured to direct, to the first device 112, the audio of a communication session between the remote device 110 and the first device 112. In these and other embodiments, the first device 112 and/or the remote device 110 may also direct the audio to the transcription system 130.

The transcription system 130 may include any configuration of hardware, such as processors, servers, and data storage that are networked together and configured to perform a task. For example, the transcription system 130 may include one or multiple computing systems, such as multiple servers that each include memory and at least one processor. The transcription system 130 may be configured to generate transcriptions from audio.

In some embodiments, the transcription system 130 may be an automatic system that automatically recognizes speech independent of human interaction to generate the transcription. In these and other embodiments, the transcription system 130 may include speech engines that are trained to recognize speech. The speech engine may be trained for general speech and not specifically trained using speech patterns of the participants in the communication session. Alternatively or additionally, the speech engine may be specifically trained using speech patterns of one or both of the participants of the communication session.

Alternatively or additionally, the transcription system 130 may be a revoicing system. In a revoicing system, a human may listen to the audio and revoice or speak the words in the audio. The revoiced audio may be provided to a speech recognition system that is trained or not trained for the particular speech of the human that is revoicing the audio. The speech recognition system may output a transcription of the revoiced audio.

In some embodiments, the transcription system 130 may be configured to obtain audio from either the remote device 110 and/or the first device 112. In these and other embodiments, the transcription system 130 may generate a transcription of the audio. The transcription system 130 may also direct the transcription of the audio to the first device 112 and/or the remote device 110. Either one or both of the remote device 110 and/or the first device 112 may be configured to present the transcription received from the transcription system 130. For example, the first device 112 may be configured to display the received transcriptions on a display that is part of the first device 112 or a display of a device that is communicatively coupled to the first device 112.

In some embodiments, the first device 112 may be configured to determine a first hearing level of a user of the first device 112. In these and other embodiments, the determination of the first hearing level of the user may be a passive determination made based on characteristics of a communication session obtained by the first device 112. For example, the first device 112 may obtain characteristics of the communication session including characteristics of first audio generated by the first device, second audio generated by the remote device 110, and/or settings of the first device 112. The first audio may be generated based on speech of the user of the first device 112. The second audio may be generated based on speech of a user of the remote device 110. In these and other embodiments, the first hearing level of the user may be determined based on one or more of the obtained characteristics. Alternately or additionally, additional characteristics may be used to determine the first hearing level of the user including characteristics regarding the user, among other characteristics. Further description regarding determining the first hearing level of the user is described with respect to at least FIGS. 2-4 of this disclosure.

In some embodiments, in response to the first hearing level of the user satisfying a threshold level, the first device 112 may take further action. In some embodiments, the first device 112 may select one or more settings of the first device 112 for adjustment in response to the first hearing level of the user satisfying the threshold level. In these and other embodiments, the first device 112 may select the one or more settings for adjustment from multiple settings of the first device 112. In these and other embodiments, the selection of the one or more settings for adjustment may be based on the first hearing level of the user. For example, when the first hearing level of the user satisfies a first threshold level but not a second threshold level, the first device 112 may select a first setting for adjustment instead of other settings of the multiple settings. When the first hearing level of the user satisfies the first and second threshold levels but not a third threshold level, the first device 112 may select a second setting for adjustment instead of other settings of the multiple settings.

The multiple settings may include volume of second audio presentation, audio enhancement of the second audio presented by the first device 112, second audio presentation with human mouth images that mimic speaking speech of the second audio, presentation of a transcription of the second audio, presentation of a transcription of the first audio, presentation of a transcription of the first audio and the second audio, presentation of a summary of transcriptions of the second audio, presentation of a summary of transcriptions of the first audio, presentation of a summary of transcriptions of the first audio and the second audio, among other settings. Additional details regarding audio enhancement of the second audio presented by the first device 112 is provided by at least FIGS. 5-7 of this disclosure. Additional details regarding second audio presentation with a human mouth images that mimic speaking speech of the second audio is provided by at least FIGS. 8-10 of this disclosure.

The summary may include named entity detection and may identify, extract, or display salient facts from the conversation such as appointments, medication information, prescription information (e.g., drug name, dose, usage instructions, and where to pick up the prescription), doctor's instructions, names of people participating in or mentioned during the communication session, decisions or agreements made during the communication session, phone numbers, web addresses, street addresses, action items a user of the first device 112 or other participants accept, phone numbers, dollar amounts, numbers, dates, times, the date, time, place, and nature of an appointment and who the appointment is with, the type or topic of the communication session (e.g. medical, legal, social, upcoming events, etc.), and communication session metadata such as time, date, call duration, location, and phone numbers.

In some embodiments, records of reminders may be generated and sent to the user of the first device 112 or others, including parties on the communication session. Reminders may be sent as email, text messages, phone calls, entries into a calendar or other reminder system, among other communication methods. Reminders may be sent at the end of the communication session or at a future time such as at the time or at a selected time span before action items are due. Reminders may include reminders to take medication, dosage, appointment details, notes on action items, notes on calendar entries, among other topics. Appointments may be inserted into calendars for the user of the first device 112 and/or other parties.

In some embodiments, the summary may be shown on a display of the first device 112 a separate web site, emailed, texted, or otherwise made accessible to the user of the first device 112. The first device 112 may include an interface that allows the user of the first device 112 to copy, save, or delete the summary. The interface may also allow the user of the first device 112 to share the summary with other parties on the call or forward the summary via email, a header attached to a voicemail recording or transcription, SMS, social media sites, among other sharing venues. The interface may allow the user of the first device 112 to search summaries and/or transcriptions from one or more communication sessions. The interface may display summaries or excerpts from summaries from multiple calls and allow the user of the first device 112 to select one to obtain a full summary or transcript or other information from the selected communication session. The first device 112 may provide the summary to the transcription system 130 where the summary may be used to improve accuracy for the remainder of the communication session or on future communication sessions. Additional details regarding generating a summary of a transcription are described in U.S. patent application Ser. No. 16/408,826 filed on May 10, 2019 and entitled "TRANSCRIPTION SUMMARY PRESENTATION," the entirety of which is incorporated herein by reference.

In some embodiments, the further action taken in response to the first hearing level of the user satisfying the threshold level may include selecting one or more settings of the transcription system 130 for adjustment. Similar to selecting the settings of the first device 112 for adjustment, the settings of the transcription system 130 may be selected based on the determined hearing level satisfying a particular threshold. In some embodiments, one or more of the multiple settings may relate to how the transcriptions are generated by the transcription system 130. For example, for lower hearing levels, more accurate transcriptions may be generated by the transcription system 130 than for higher hearing levels. As another example, for higher hearing levels, the transcription system 130 may use a less sophisticated automatic speech recognition (ASR) system. For lower hearing levels, the transcription system 130 may use a more sophisticated ASR system. More sophisticated ASR systems may include combinations of ASR systems, revoicing systems, and/or combination of ASR and revoicing systems, such as the combination of ASR systems and the combination of ASR and revoicing systems described in U.S. patent application Ser. No. 16/209,623 filed on Dec. 4, 2018 and entitled "TRANSCRIPTION GENERATION FROM MULTIPLE SPEECH RECOGNITION SYSTEMS," the entirety of which is incorporated herein by reference. Other ASR systems with varying levels of sophistication are also described in U.S. patent application Ser. No. 16/209,623. In some embodiments, settings of the transcription system 130 may relate to invoicing of the transcription service provided by the transcription system 130.

In some embodiments, the further action taken in response to the first hearing level of the user satisfying the threshold level may include determining a second hearing level of the person. The second hearing level of the person may be an active determination. In some embodiments, the second hearing level may be determined based on the first device 112 presenting a third audio signal to the user. In response to presenting the third audio signal, the first device 112 may obtain input from the user. For example, the third audio signal may include a tone and the first device 112 may obtain an indication from the user regarding whether the tone is heard by the user. Based on the input from the user, the first device 112 may determine the second hearing level of the user.

The second hearing level of the user may be compared to one or more threshold levels. In response to the second hearing level satisfying one or more threshold levels, additional action may be taken by the first device 112. The actions taken by the first device 112 may be analogous or different than the actions taken by the first device 112 in response to the first hearing level of the user satisfying threshold levels.

In some embodiments, the second hearing level may be a more accurate determination of a hearing level of a user. In these and other embodiments, the actions taken in response to the second hearing level may further refine the actions taken in response to the first hearing level. For example, the second hearing level of the user may be determined to be less than the first hearing level. In these and other embodiments, the first device 112 may take actions to compensate for the decreased hearing level of the user. For example, based on the first hearing level, the first device may have employed enhancement of the second audio. Based on the second hearing level, the first device 112 may also employ second audio presentation with a human mouth images that mimics speaking speech of the second audio.

As another example, the second hearing level of the user may be determined to be more than the first hearing level. In these and other embodiments, the first device 112 may take actions to compensate for the increased hearing level of the user. For example, based on the first hearing level, the first device 112 may have presented transcriptions of the second audio and employed enhancement of the second audio presented by the first device 112. Based on the second hearing level, the first device 112 may stop the presentation of transcriptions of the second audio and continue employing enhancement of the second audio presented by the first device 112.

In some embodiments, the first device 112 may determine the first hearing level of the user at regular or irregular intervals and/or at regular or irregular intervals during communication sessions participated in by the first device 112. Alternately or additionally, the first device 112 may determine the first hearing level of the user in response to an action. For example, in response to the user of the first device 112 touching an input to the first device 112, the first device 112 may determine the first hearing level of the user.

The action may include user interactions with the first device 112, request for communication sessions obtained by the first device 112, establishment of communication sessions by the first device 112, user action during a communication session, establishment of a communication channel with the transcription system 130, requests from third-parties, requests from disparate systems, such as the transcription system 130, among other actions.

In some embodiments, determining the first hearing level of the user may be dynamic such that the hearing level determined may change based on changes in the environment surrounding the first device 112 without a physical hearing level of the user changing. For example, the hearing level determined in a noisy environment may be less than the hearing level determined in a quiet environment. Thus, the first device 112 may determine the first hearing level as different in the two different situations and take different actions in response to the different determined first hearing levels. Thus, the actions taken by the first device 112 during a first communication session may be different than actions taken during a second communication session without input from the user of the first device 112. For example, the first device 112 may determine a level of noise of the environment during a communication session. Based on the level of noise, the first device 112 may select a first level of hearing from multiple first levels of hearing that is associated with the level of noise.

Alternately or additionally, actions taken by the first device 112 may change during a communication session in response to a change in the first hearing level determined by the first device 112 during the communication session. In these and other embodiments, the first device 112 may determine a type of action during a communication session with a third-party device. In these and other embodiments, the first device 112 may be configured to apply the type of action during future communication sessions with the third-party device. For example, the first device 112 may be configured to determine a first hearing level during an initial communication session with a third-party device. The first device 112 may use the determined first hearing level for future communication sessions with the third-party device. In these and other embodiments, the first device 112 may adjust the first hearing level based on changes to the environment or other factors, such as changes to the first hearing level in other situations.

In an analogous manner, in some embodiments, the first device 112 may determine the second hearing level of the user in response to an action. In these and other embodiments, the action may include those previously described with respect to the first hearing level. In these and other embodiments, the second hearing level may be determined without determining the first hearing level. Thus, in some embodiments, the second hearing level may be determined independent of determining the first hearing level.

In some embodiments, the first device 112 may determine the first hearing level of the user in response to an action as described in this disclosure. In these and other embodiments, the first device 112 may consider the action in addition with previous actions to make the determination of the first hearing level. For example, the first device 112 may consider characteristics of multiple previous communication sessions and other characteristics obtained previously to determine the first hearing level in addition to the action. For example, the first device 112 may use characteristics on a rolling basis such that characteristics from a particular time previous to the current time may be used but characteristics before the particular time are not used. Thus, in these and other embodiments, a change in the environment surrounding the first device 112 that affects one of the characteristics may have a reduced effect on the determined first hearing level.

An example of the operation of the environment 100 follows. The first device 112 may be associated with a user. The first device 112 may obtain a request for a first communication session from the remote device 110. In response to obtaining an indication from the user, the first device 112 may establish the communication session. During the communication session, the first device 112 may analyze the audio generated by the first device 112. Based on the audio, the first device 112 may determine that the user has a first hearing level. Based on the first hearing level satisfying a first threshold, the first device 112 may adjust the setting of first device 112 with respect to audio enhancement by activating the audio enhancement of the first device 112. The first device 112 may adjust the setting during the communication session to activate the audio enhancement during the communication session.

After the communication session, the user may interact with the first device 112. Based on the interaction, the first device 112 may make a determination that the user has a second hearing level that satisfies a second threshold level. As a result, the first device 112 may adjust an additional setting by activating audio presentation with human mouth images that mimic speaking speech of the audio. During a second communication session, the first device 112 may thus present audio of the second communication session with audio enhancement and human mouth images that mimic speaking speech of the audio.

Modifications, additions, or omissions may be made to the environment 100 and/or the components operating in the environment 100 without departing from the scope of the present disclosure. For example, the first device 112 may be a configuration of multiple devices associated with a user that are configured to perform the operations of the first device 112 described in this disclosure. For example, the operations of the first device 112 may be performed by a second device that presents audio, a third device that presents transcriptions of audio, and a fourth device that coordinates sending the audio to and obtaining the transcriptions from the transcription system 130. For example, the first device may include a demonstration mode with simulated operations such as presenting live or recorded audio with video of lips moving and playing live or recorded audio as the audio may be heard by a hearing impaired user with and without audio enhancement.

As another example, in some embodiments, the second hearing level of a user may be determined without determining the first hearing level of the user. In these and other embodiments, a device, such as the first device 112, may perform operations or may direct performance of operations, or provide an indication for operations to be performed by another system or device in response to the second hearing level that are described with respect to the first hearing level. While multiple hearing levels are described, the systems and methods may perform any disclosed functionality with respect to any of the hearing levels determined.

Alternately or additionally, more than two different hearing levels of the user may be determined. In these and other embodiments, the operations performed or factors considered when determining the second hearing level may be divided to determine multiple hearing levels of a user.

Figure 2:
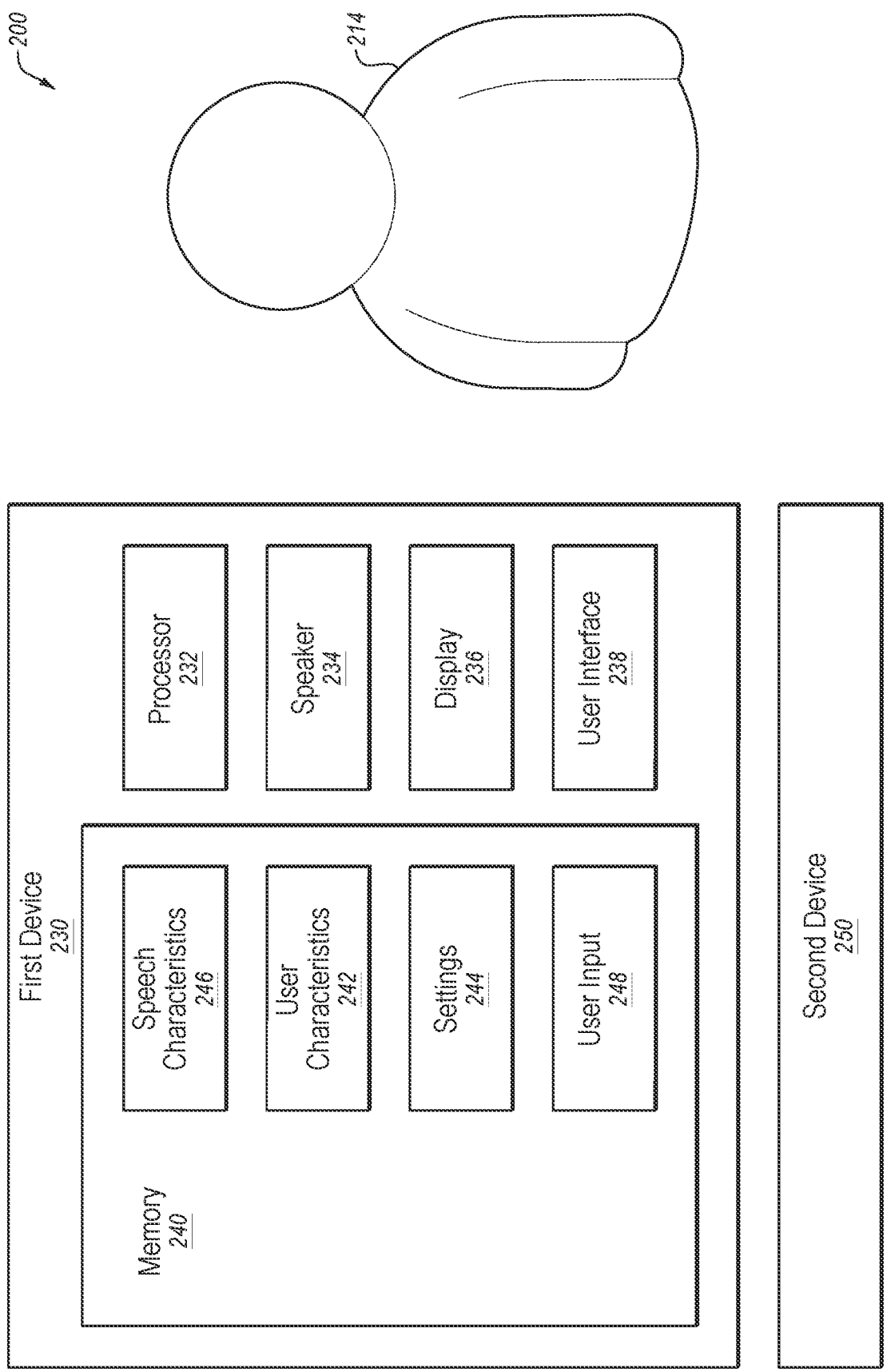
FIG. 2 illustrates another example environment for hearing accommodation.

FIG. 2 illustrates another example environment 200 for hearing accommodation. The environment 200 may be arranged in accordance with at least one embodiment described in the present disclosure. The environment 200 may include a first device 230, a second device 250, and a user 214. The first device 230 may be associated with the user 214. The association between the user 214 and the first device 230 may include the user 214 using and/or owning the first device 230.

The first device 230 may include a processor 232, a memory 240, a speaker 234, display 236, and a user interface 238. The memory 240 may include user characteristics 242, settings 244, speech characteristics 246, and user input 248.

In some embodiments, the first device 230 may operate in an environment analogous to the environment 100 of FIG. 1 in a manner analogous to the first device 112 of FIG. 1. In these and other embodiments, the first device 230 may be analogous to the first device 112 and may be configured to determine a first hearing level and a second hearing level of the user 214. In these and other embodiments, the first device 230 may be configured to adjust one or more settings of the first device 230 and/or a transcription system in response to the first hearing level satisfying a first threshold level, a second threshold level, or other threshold levels. Alternately or additionally, the first device 230 may be configured to direct adjustment of one or more settings of a transcription system communicatively coupled with the first device 230, as explained with respect to FIG. 1, in response to the first hearing level and/or in response to the first hearing level satisfying a first threshold level, a second threshold level, or other threshold levels.

In some embodiments, the first device 230 may be configured to determine a first hearing level of the user 214 based on one or more of: the user characteristics 242, the settings 244, the speech characteristics 246, and the user input 248.

The user characteristics 242 may include an age of the user 214. An age of the user 214 may be obtained from records regarding the user 214 stored in the first device 230 or at a separate system. Alternately or additionally, the age of the user 214 may be estimated from a sound of a voice of the user 214 and/or an image of a face of the user 214. For example: one or more of breathiness, loudness, a trembling voice, pitch jitter, pitch average, range, histogram, distribution, patterns, spectral characteristics, and/or an analysis of an image of the user 214, may be used to estimate age of the user 214. In these and other embodiments, other indicators may be used to estimate an age of the user 214. For example, the indicators may include speed at which the user 214 may interact with the first device 230 such as how quickly the user dials numbers or presses other buttons or how quickly the user responds to written screen prompts or recorded prompts, usage patterns of the first device 230, speaking patterns of the user 214, such as usage of archaic words and phrases, environmental factors that may be detected by the first device 230, such as turning on and off of lights, noise, etc., that may be used to estimate the age of the user 214. The age of the user 214 may also be estimated based on an estimated age of people associated with communication sessions involving the first device 230. In these and other embodiments, indicators that may be used to estimate the age of the user 214 may be used to estimate hearing loss or other characteristics of the user 214 such as mental acuity and other factors that may be used to estimate hearing loss.

The user characteristics 242 may also include characteristics associated with the user 214, including a hearing profile of the user 214, gender, past and current hearing test results and other historical user information, the amount of time that has passed since one or more previous hearing tests, an audiogram, settings applied to a hearing aid associated with the user 214, the estimated ambient noise level at a location of the first device 230, the estimated ambient noise level at a location of the remote device 110, an estimate of difficulty to understand one or more parties of a communication session, a measure of how quickly the user 214 speaks in response to establishing a communication session or after speech of another part in the communication session, the number of communication session made, the amount of time the user 214 participates in communication sessions, a history of purchasing goods and services, account status such as whether the user 214 is current on payments for a subscription service, an indication that the user 214 is willing to pay or has provided payment information for a product or service, an indication of whether the user 214 has activated transcriptions of communication sessions, a geographical location for the user 214, a spoken language of the user 214 use of hearing aids by the user 214, including types of the hearing aids, parameters of the hearing aids, whether the user 214 has a hearing aid, whether the user 214 is using a hearing aid during a communication session, etc. The first device 230 may determine that the user 214 uses a hearing aid based on the hearing aid being paired with the first device 230, the first device 230 detecting the hearing aid based on sounds made by the hearing aid that are captured by a microphone of the first device 230, a camera that captures an image of the hearing aid, other electronic noise of the hearing aid that may be captured by the first device 230, among other methods such as input from the user 214. Types of hearing aids may include hearing loops, cochlear implants, earphones, and hearing devices that use wireless connections such as 802.11 or other wireless standards.

The user characteristics 242 may further include expressions of the user 214 during communication sessions that involve the user 214 and the first device 230. For example, during an audio communication session, expressions of the user 214 may be captured by a camera. The expressions may be analyzed to determine a type of the expression. Expressions of confusion, uncertainty, lack of response to another speaker, or other types of expressions may be used to determine a hearing level of the user.

The user characteristics 242 may also include a degree to which the user 214 is viewing the first device 230 during a communication session when the first device 230 is presenting information to assist the user 214 to understand the communication session. For example, the information that may be presented may include transcriptions of audio, summary of transcriptions of audio, and mouth images. In these and other embodiments, the first device 230 may determine whether the user 214 is viewing the information that is being presented by the first device 230. For example, the first device 230 may determine if the user 214 is viewing the information based on images of the user 214. Alternately or additionally, the first device 230 may determine how often or for what percent of time the user 214 is viewing the information presented by the first device 230. Alternately or additionally, the first device 230 may determine a delay between a time that the information is presented and a time when the user 214 responds. For example, the user 214 may respond before the transcription is presented or may respond after the transcription is present. Waiting to respond until after the transcription is present may indicate that the user 214 is relying on the transcription for understanding and formulating a response. In contrast, responding before the transcription is present may indicate that the user 214 is understanding the communication session and is able to formulate a response without assistance by the transcription. As another example, when information is provided for some conversations but not others, the behavior of the user 214 when the information is provided and when the information is not provided may be compared.

The settings 244 may include a volume level of the device 230. The settings 244 may also include a font size, tone settings, among other sound or presentation settings of the first device 230. Other settings 244 may include user activation or deactivation of settings that may be adjusted by the first device 230 in response to a first hearing level of the user 214. For example, the settings may include audio enhancements, transcriptions of audio, presentation of human mouth images that mimic speaking, presentation of a summary of transcriptions of audio, among other settings that may be activated or deactivated. Settings 244 may be configured automatically, by the user 214, or by another person such as an installer or agent.

The speech characteristics 246 may include speech characteristics of the user 214 and/or speech characteristics of a third-party that participates in a communication session involving the first device 230. The speech characteristics may include speech patterns of the user 214 and/or the third party. Speech patterns such as stuttering, hesitations, repeating words, rate of speech, pauses in the speech, carefulness of speech, loudness of speech, among others of the user 214 and/or the third party. Carefulness of speech may be determined using spectral features, pauses, and other factors input to a machine learning program. Loudness of speech may be measured using absolute volume, pitch, pitch patterns, range, or other spectral features that may be examined and used to determine speaker stress or other factors related to speaking loudly. In some embodiments, the Lombard effect, which is a measure of vocal effort applied to attempt to be understood in adverse circumstances, may be used as a proxy for loudness. Loudness of speech may be measured using volume relative to a reference such as a previously measured volume or volume of another speaker.

Speech patterns of the third party that include repeating words may indicate that the user 214 is not hearing and/or understanding a conversation and thus has a reduced hearing level. Other speech characteristics may include pauses or delays when the user 214 should be speaking based on conversation characteristics such as the cadence of speakers taking turns. For example, a long average time delay between when a third-party stops speaking, and the user 214 starts speaking may indicate that the user 214 has difficulty understanding or that the user 214 is relying on transcriptions and/or a summary that may result in the delay. The degree to which the user 214 interrupts a third-party may also be determined and used as part of the speech characteristics 246.

The speech characteristics 246 may also include words in the speech. For example, words spoken by the user 214 such as "Huh?" or "What?" regarding repeating speech, slowing down, among other indicators of a reduced hearing level. As another example, words spoken by a third-party regarding understanding, repeating words, among others may be used as the speech characteristics 246. For example, words and phrases such as "Did you hear me?" or "Are you there?" or speaking the user's name may indicate that the third-party believes the user is not hearing parts of the conversation. As an example, if a user 214 says "What?" at least N1 times per minute, the third-party asks the user 214 if they heard what the third-party just said at least N2 times per minute, or the user 214 waits for a transcription before responding at least N3 percent of the time, then the first device 230 may determine that user 214 has a hearing loss.

The user input 248 may include input obtained from the user 214. The input may include how the user 214 responds to questions regarding hearing, promotional material regarding hearing produces and services, among other interactions with the first device 230.

In some embodiments, the first device 230 may be configured to determine a first hearing level of the user 214 based on data collected by the first device 230, including the data from one or more of: the user characteristics 242, the settings 244, the speech characteristics 246, and the user input 248. In these and other embodiments, the processor 232 may access the memory 240 to obtain the data collected by the first device 230. In these and other embodiments, the processor 232 may follow instructions to determine the hearing level of the user 214 based on the data.

In some embodiments, the first device 230 may be configured to determine the first hearing level based on one type of the data. For example, if the user 214 waits to respond during a conversation until after a transcription of audio of the conversation is presented, the first device 230 may determine the first hearing level based on only the user 214 waiting to respond.

Alternately or additionally, the first device 230 may be configured to determine the first hearing level based on rules that consider multiple data points from one or more of the user characteristics 242, the settings 244, the speech characteristics 246, and the user input 248. For example, the first hearing level may be based on how loud the user 214 speaks, how loud a third-party speaks, and the user 214 waiting to respond during a conversation until after a transcription of audio of the conversation is presented. For example, the rules may determine the first hearing level is at a first degree based on the loudness of the user 214 speaking above a first level, the loudness of the third-party speaking above a second level, and the user 214 waiting to respond during a conversation until after a transcription of the audio is presented for more than a first percentage of responses. As another example, the rules may determine the first hearing level is at a second degree based on the loudness of the user 214 speaking above a third level, the loudness of the third-party speaking above a fourth level, and the user 214 waiting to respond during a conversation until after a transcription of the audio is presented for more than a second percentage of responses.

Alternately or additionally, the first device 230 may be configured to use a machine learning model to determine the first hearing level of the user 214. For example, a first database of features may be determined from a first group of users determined to have hearing loss or certified to be eligible for transcription of communication sessions and a second database of features may be determined from a second group of speakers not determined to have hearing loss such as speakers using the remote device 110. Features and characteristics of the two databases may be compared to each other using a machine learning program that learns how to distinguish the two groups. A machine learning program may be similarly used to estimate age. In these and other embodiments, the machine learning model may be constructed by training a machine learning algorithm with data that may be provided to the machine learning algorithm that is classified with different hearing levels. Different types of machine learning methods may be used. For example, a hearing level estimate may be constructed as the sum of multiple use characteristics 242, each characteristic 242 multiplied by a weight prior to the summation. The weights may be determined using a method such as a gradient search, linear discriminant analysis, a support vector machine, among other methods. As another example, a hearing level may be estimated using the output of a neural network, where one or more user characteristics 214 are used as input to the neural network.

In some embodiments, the first device 230 may be configured to determine a second hearing level of the user 214. The second hearing level of the user 214 may be determined by administration of a hearing test to the user 214 by the first device 230.

In some embodiments, the first device 230 may be configured to determine the second hearing level in response to the first hearing level satisfying a threshold level. For example, in response to the first hearing level being determined to be below seventy percent of an average hearing level, the first device 230 may administer a hearing test to determine the second hearing level of the user 214. In these and other embodiments, the threshold level may be 10, 20, 30, 40, 50, 60, 80, 90 or some other level between 0 and 100 percent of the average hearing level of a person with normal hearing.

In some embodiments, the first device 230 may be configured to determine the second hearing level in response to other factors rather than the first hearing level. For example, the first device 230 may be configured to determine the second hearing level at random intervals, particular intervals, in response to being initialized, in response to a certain age of the user 214, in response to usage or change in usage of the first device 230, in response to user input or presentation of material by the first device 230, among other factors.

In some embodiments, the first device 230 may be configured to determine the second hearing level by administration of a hearing test. In these and other embodiments, the first device 230 may be configured to broadcast a tone by way of the speaker 234. The first device 230 may present instructions, through the speaker 234 and/or the display 236 for the user 214 to provide input to the first device 230 through the user interface 238 in response to the user 214 hearing the tone. Before presenting the tone, the first device 230 may instruct the user 214 to a particular position with respect to the first device 230. In some embodiments, the speaker 234 of the first device 230 may be part of a handset. In some embodiments, the first device 230 may include two speakers, one in the base and one in the handset. One or both may be active at a given time, depending on factors such as those included in the settings 244. In these and other embodiments, the first device 230 may direct the user 214 to hold the handset to one of the ears of the user 214.

In some embodiments, to administer the hearing test the first device 230 may be configured to broadcast two tones of different frequencies. In these and other embodiments, the first device 230 may request that the user 214 provide input regarding which of the two tones is louder based on the perception of the user 214.

In some embodiments, to administer the hearing test with improved accuracy, a volume of the tones output by the first device 230 may be considered. The administration of a hearing test may assume that the tones broadcast by the speaker 234 of the first device 230 are broadcast with a particular sound pressure level. In these and other embodiments, the first device 230 may be calibrated to help ensure that the tone broadcast by the speaker 234 is at a particular sound pressure level.

In some embodiments, to calibrate the speaker 234, calibration instructions may be performed by the first device 230 to adjust the volume level at which the tone is broadcast such that the tone broadcast is closer to a particular sound pressure level for administration of the hearing test. In these and other embodiments, the calibration instructions may use a model number of the first device 230, software version of the first device 230, and other audio path characteristics of the first device 230 to calibrate the speaker 234. In some embodiments, the speaker 234 may be attached to the first device 230, such as a headset or some other piece of hardware. In these and other embodiments, the characteristics of the speaker 234 may be known and used to calibrate the speaker.

In some embodiments, a separate device may be used to measure the sound pressure levels of a tone broadcast by the first device 230 and/or the speaker 234. The separate device may be the second device 250. The separate device may be a smartphone or other computer. In these and other embodiments, the second device 250 may include a microphone and may measure the sound pressure level of a tone broadcast by the first device 230. In these and other embodiments, the second device 250 may provide the sound pressure level to the first device 230. The first device 230 and/or the speaker 234 may be calibrated based on the sound pressure level. In some embodiments, the first device 230 may obtain the tone to be played by establishing a communication session with another device or system that may direct the tone to the first device 230 during the communication session.

In some embodiments, the first device 230 may be configured to determine the second hearing level by presenting one or more questions to the user 214. The first device 230 may obtain input from the user 214 in response to the presentation of the one or more questions. The results of the questions may be used to determine the second hearing level of the user.

In some embodiments, the first device 230 may be configured to determine the second hearing level by administering another type of hearing test through the display 236, the user interface 238, and/or the speaker 234. Alternately or additionally, the first device 230 may be configured to determine the second hearing level based on measuring cognitive abilities of the user 214. Alternately or additionally, the first device 230 may be configured to establish a communication session with a professional, such as an audiologist. The professional may administer a hearing test by way of the first device 230 to determine the second hearing level of the user 214. The professional may use a device such as a computer, mobile device such as a smartphone, or telephone to remotely observe the hearing test by listening and/or by reading measurements on a display. For example, the professional may use a browser to access a web page hosted on the first device 230 or on a separate hosting server. The professional may direct one or more aspects of the hearing test such as skipping or repeating portions of the test, changing the frequency and/or amplitude of tones, giving the user 214 directions, and modifying the testing protocol. The professional may communicate with the user 214 by voice over an audio channel and/or by text. The audio channel may include speaker 234 and a microphone incorporated into the first device 230. Text from the professional may appear on display 236 or on the screen of a separate computer or smartphone.

In some embodiments, after determining the first hearing level, the first device 230 may be configured to adjust a setting of the first device 230 and/or direct adjustment of a setting of a transcription system communicatively coupled to the first device 230. The setting to be adjusted and the adjustment amount of the setting may be selected based on the first hearing level. Alternately or additionally, after determining the second hearing level, the first device 230 may be configured to adjust a setting of the first device 230 and/or direct adjustment of a setting of a transcription system communicatively coupled to the first device 230. The setting to be adjusted and the adjustment amount of the setting may be selected based on the second hearing level and/or on some combination of the first hearing level and the second hearing level. Adjusting settings of the first device 230 may include adjusting settings used by the transcription system 130 when communicating with the first device 230. The setting to be adjusted and the adjustment amount of the setting may be selected based on input from the user and/or a professional. For example, the user 214 may use the first device 230 to elect to turn captions on or off.

The description with respect to FIG. 2 discusses determining first and second hearing levels in some embodiments. In some embodiments, a single hearing level of the user 214 may be determined. In these and other embodiments, the factors considered in determining the first and second hearing levels may be combined to determine the hearing level of the user 214. For example, a hearing level of the user 214 may be determined based on features from the user characteristics 242, the settings 244, the speech characteristics 246, and the user input 248, from an administered hearing test, and from measured cognitive abilities of the user 214, among other features discussed in this disclosure. In these and other embodiments, a neural network or other machine learning method may be used to determine the hearing level given the inputs defined. Alternately or additionally, one or more of the user characteristics 242, the settings 244, the speech characteristics 246, and the user input 248, an administered hearing test, and measured cognitive abilities of the user 214, among other features discussed in this disclosure may be used to determine a hearing level of the user 214. Thus, any combination of features, tests, characteristics, and information described in this disclosure may be used to determine a hearing level of the user 214.

The multiple settings of the first device 230 may include volume of audio presentation, audio enhancement of the audio presented by the first device 230, audio presentation with human mouth images that mimic speaking speech of the audio, presentation of a transcription of audio, presentation of a summary of transcriptions of audio, among other settings. The multiple settings of the transcription system may relate to how the transcriptions are generated by the transcription system.

In some embodiments, the first device 230 may perform other functions. For example, in some circumstances, obtaining transcriptions of a communication session may be provided to qualifying individuals at a reduced costs or fee based on a governmental program. For example, the U.S. Federal Government or authorized entities such as reimbursed service providers may provide transcriptions of communication sessions for individuals at reduced cost or no cost when the individuals obtain certification of hearing loss. The first device 230 may provide transcriptions at a reduced accuracy level or on a trial basis.

In some embodiments, the first device 230 may be configured to determine if the user 214 of the first device 230 is a certified user of the first device 230 before presenting transcriptions of a communication as a hearing accommodation. A certified user may indicate that the user has been tested and/or that certification obtained and/or that the user has hearing loss to qualify for reduced or no cost transcriptions of audio. In these and other embodiments, the first device 230 may verify the identity of the user 214 using one or more of the following: comparing fingerprints (with a sensor on the phone or handset) or voiceprints, hand geometry, asking for a password or phrase or PIN, face ID using a camera on the phone or smartphone, iris identification using a camera, other biometrics, and/or asking the person to enter or say their name or password/PIN. Alternately or additionally, the first device 230 may use position or motion of the first device 230 or a handset of the first device 230 to determine an identity of the user 214. In some embodiments, the first device 230 may ask for alternative identification if a first check fails. For example, if the voiceprint of the user 214 fails, the first device 230 may ask for an authentication code.

In some embodiments, the first device 230 may be configured to certify the user 214 to receive transcriptions of audio of communication sessions at a reduced or free rate. In response to determining that the user is eligible, the first device 230 may activate the transcriptions of communication sessions, submit a request for transcriptions of communication sessions, or provide transcriptions of communication sessions request information to a third party (audiologist or other professional, transcription provider, government entity, insurance company, etc.) so that the third party may activate or request the service. The first device 230, with input from the professional and/or the user 214, may certify the user 214 or submit a request to certify the user 214 to receive transcriptions of communication sessions. The certification or certification request may include entering information associated with the user 214 into one or more databases. The information may include a name; username; password; phone number; alternate contact information; an identifier such as a serial number or MAC address associated with the first device 230; mailing address; one or more personal identification numbers such as a social security number or driver's license number; the last four digits of a social security number; qualifying information such as results from one or more hearing tests; images of documents such as driver's license or other ID, state ID, passport, social security card, utility bill, parental consent form, or birth certificate; information or certification by a legal guardian of user 214; settings such as speaker volume and/or whether transcriptions of communication sessions are set as a default; a self-certification by the user 214 that the user 214 needs or is eligible to receive service (such as clicking a button or screen icon or checking a box); an indication that the user 214 accepts an end-user license agreement; a signature; a scanned signature; an electronic signature; or birth date. In these and other embodiments, images of documents to be submitted may be captured by a camera, which may be included in the first device 230.

In some embodiments, selected types of information, such as information about the user 214, may be assigned to a first database and selected types of information, such as document images, may be assigned to a second database. In some embodiments, information associated with the professional assisting with the certification of the user 214 such as title, profession, name, street address, email address, professional identification number, and phone number may be entered into one or more databases. Additional information such as type of product or service requested, notes, date, location, account number, and promotional code may be entered into the one or more databases.

In some embodiments, a certification system may access one or more of the one or more databases with the information associated with certification. Based on accessing the information, the certification system may determine whether the user 214 is eligible for a given service, such as transcriptions of communication session, and/or to determine whether the user 214 is eligible for a free or discounted service. In response to the certification system determining that information provided is incorrect or inadequate, the certification system may request additional information from the user 214, from the professional who certified the user 214, from a service provider, or from another party, including other systems and databases. The request for additional information may be sent by electronic means such as via email or using an application programming interface (API).

In some embodiments, the first device 230 may be configured to certify the user 214 based on one or more of the determined first hearing level, the determined second hearing level, answers to questions obtained from the user 214 relating to medical conditions, financial status, need for the service, and/or the user 214 confirming certification. In some embodiments, a database may track a certification status of the user 214 and date of prior certification activities. In these and other embodiments, the first device 230 may be configured to recertify the user 214 at particular intervals.

In some embodiments, the user 214 may qualify for other services, such as those hearing accommodations described in this disclosure. In these and other embodiments, when certifying or otherwise determining a hearing level of the user 214, the first device 230 may determine eligibility of the user and register the user 214 for additional services and/or products. Registration may include entering a record for the user 214 in a user registration database. The first device 230 may present ads and locate discounts for equipment or services, set up appointments, order equipment, apply for reimbursement, and submit paperwork. The user 214 may respond to an ad by clicking an icon, URL, link, or phone number on display 236. The response from user 214 may cause the first device 230 to connect to a person, website, voice response system, or other entity and the first device 230 may provide information associated with user 214 to the entity. The first device 230 may submit test results and the answers to questions and signed documents as part of applications for products and services. The first device 230 may provide necessary information to a professional so that the professional may generate and/or submit forms or applications. The first device 230 may offer the user 214 an incentive for subscriptions of purchases. For example, the first device 230 may offer the user 214 a rebate or discount against the price of the phone if the user 214 is certified or meets other eligibility requirements.

The first device 230 may request the user 214 to confirm information such as address, contact information, demographics, credit card number and other billing information, consent to provide service or otherwise intercept or capture calls, record call content such as audio or text, and self-certification responses (e.g. "I certify under penalty of perjury that my answers are truthful and that I require the service."). Consent and other information may be stored in a database and used to determine whether the user 214 is eligible for a product or service. As laws and regulations change, service provider policies and features change, eligibility rules and testing processes change, technology advances, and as user needs change, the first device 230 may receive software updates to modify the capabilities of the first device 230.

As another example of other functions performed by the first device 230, the first device 230 may be configured to present advertisements regarding other audio accommodations, such as requesting transcription service, a hearing aid, an adjustment to a hearing aid, a newer communication device, sign language interpreting, language translation, among others. Alternately or additionally, the first device 230 may suggest that the user 214 undergo further testing of the hearing of the user 214.

In some embodiments, the other functions may include requesting that the user 214 participate in further testing to further analyze the hearing level of the user 214. In these and other embodiments, the first device 230 may set up an appointment or direct that contact information regarding the user 214 be provided to a professional, such as an audiologist, in the manner of a referral. The referral may be conveyed via a scheduling system, an office management system used by the professional, a database accessible to multiple professionals, an email, a voicemail message, a direct connection to the professional's office, etc. In setting up an appointment, the first device 230 may access a calendar associated with user 214 and/or a professional's calendar, may recommend one or more professionals, may provide ratings, contact information, a rank ordering, cost information, and may invite the user 214 to select or confirm an appointment time. The appointment may be for a periodic checkup, based on the date of the previous checkup, or the appointment may be to test and certify the user 214 for services such as transcriptions of communication sessions. The first device 230 may invite the user 214 to select a professional. The first device 230 may select or recommend one or more professionals based on factors such as a professional's membership or status with a paid or unpaid subscription service, a professional's availability, the user characteristics 242, preferences of the user 214, a professional's history with the user 214, a professional's geographical proximity to the user 214, types of services offered, a professional's relationship with a vendor providing services to hearing impaired users, among other factors. The first device 230 may configure a calendar service to remind the user 214 of the appointment. Alternately or additionally, a transcription system or other party may be notified of the referral. In some embodiments, an incentive system may enable the professional to pay for referrals and/or may reward the professional for referring patients to products and services. In these and other embodiments, the first device 230 may provide the data collected by the first device 230 regarding the hearing level of the user 214 to the professional or other service suggested by the first device 230.

In some embodiments, the other functions may include connecting the user 214 to a sign language interpreter or language translator. The signs of the user 214 may be captured by a camera on the phone and signs and/or text captions from a third-party may be presented on the display 236. The first device 230 may provide sign language interpreting or language translation, depending on settings of the first device 230 and/or the transcription system 130.

In some embodiments, the first device 230 may include an audiogram of the user 214. In these and other embodiments, the first device 230 may use the audiogram to adjust audio output by the first device 230. For example, the first device 230 may selectively amplify or attenuate various frequencies or frequency bands in response to the audiogram. In these and other embodiments, the first device 230 may create or adjust the audiogram based on the determined first hearing level and/or the determined second hearing level. In these and other embodiments, the first device 230 may communicatively couple with a hearing aid of the user 214 and provide the audiogram determined by the first device 230 based on the first hearing level and/or the second hearing level to the hearing aid. The first device 230 may provide configuration information such as volume to the hearing aid.

The first device 230 may also include additional features. For example, the first device 230, communicatively coupled to a device used by an professional, such as an audiologist, may be configured to allow the professional to schedule and/or perform a virtual appointment with the user 214 using the first device 230. The virtual appointment may be voice, video, and/or text and may include images or other graphics displayed on the display 236 or another device. For example, the professional may direct that an image be presented on the display 236. The image may include an audiogram or other chart of the hearing sensitivity by frequency of the user 214 showing hearing loss, photos of a hearing aid or cochlear implant, illustration of the inner ear, etc., and remotely point (using a mouse or touch screen, for example) to points on the image. In these and other embodiments, the user 214 may also point to the display 236 and a pointer may appear on a screen of a device used by the professional. In these and other embodiments, the device of the professional may also remotely control functions of the first device 230 such as touching the screen, updating software, rebooting the first device 230, and changing settings.

During a virtual visit, the professional may administer a hearing test using the device 230. The device of the professional may, for example, direct the first device 230 to present a tone. The professional may ask the user 214 over the communication session if the user 214 hears the tone. The user may respond verbally, by pressing a button or otherwise interacting with the device 230, by making a gesture such as raising a hand and where the gesture may be captured by a camera and detected by the professional or by image analysis software, among other response options. For example, the device of the professional may direct the device 230 to play audio at different volume levels, tones, amplitudes, and ask the user to indicate (verbally, by pushing a button, by making a gesture, or by selecting an icon in the display) what was heard. Alternately or additionally, the audio at different volume levels may be communicated to the first device 230 over an audio communication session in a similar manner that voice of the professional may be communicated to the first device 230. Alternately or additionally, the first device 230 may present audio with a word that the user then selects from two similar sounding words on the display 236. Alternately or additionally, the display 236 may present a paragraph in text and audio simultaneously, except that there are differences between the audio and text such as word substitutions. The user 214 may indicate which printed word are different from the recording. During the virtual visit, portions of the hearing test may be repeated or omitted.

In some embodiments, the professional device may also update an audiogram, programming, and/or settings for a hearing aid of the user 214. In these and other embodiments, the updated information may be directed to the first device 230. In these and other embodiments, the first device 230 may be configured to communicate with the hearing aid of the user 214 and provide the updated information to the hearing aid.

In some embodiments, the professional may consult with the user during a communication session between the first device 230 and the device of the professional. For example, the professional may demonstrate new products and services. Alternately or additionally, the professional may email, text, or otherwise send materials to the user such as brochures, videos, user guides, animated diagrams, written instructions, forms to be signed, advertisements, appointment reminders, web links, software, and/or updates for the first device 230 and/or hearing aid, diagrams for illustrating principles the professional is explaining, and/or other media.

In some embodiments, virtual appointments may be set up automatically by the first device 230, by the professional's office automation system, and/or by either party (the user or the professional) initiating a communication session between a device of the professional and the first device 230 and/or another device associated with the user 214. In these and other embodiments, appointments may be entered in a calendar of the user 214 and in the calendar of the professional. In these and other embodiments, an appointment fulfillment application on professional's office automation system may establish a communication session between the first device 230 and the device of the professional to start the virtual visit. In these and other embodiments, a transcription may be generated of the speech of the virtual appointment to assist the user 214 to understand the professional's instructions.

In addition to performing a virtual appointment, the first device 230 may also be configured to present advertisements and/or offer coupons for products and services such as medical services, groceries, etc. The first device 230 may also solicit referrals from the user 214 and/or a third party associated with a device that is communicating with the first device 230. The referrals may be associated with obtaining hearing accommodations, receiving diagnosis of hearing loss, and/or anything else referring to hearing loss and hearing accommodations.

Alternately or additionally, the first device 230 may select a third party for a referral based on an estimate of the hearing loss of the third party, the number of times and/or length of time the user 214 talks to the third party, an estimate of how much time the third party spends in conversation, an estimate of the age of the third party, and other factors associated with the third party. The other factors may include characteristics described herein as applying to the user 214 such as the user characteristics 242, the settings 244, the speech characteristics 246, and the user input 248.

Based on the type of referrals, the referrals may be forwarded to a professional, a transcription system, a government entity, a database, a machine learning program, a sales organization, and/or other affiliate. In these and other embodiments, the first device 230 may connect the user 214 to a sales representative and/or telemarketing agent, provide a URL to a website, provide a telephone number, order a product or service on behalf of the user (after collecting permission), etc. Products offered by the first device 230 may be selected based on the age of the user 214, content of communication sessions participated in by the user 214, hearing test results, and/or other information known about the user 214.

In some embodiments, the first device 230 may allow one or more professionals to advertise on the first device 230. The first device 230 may allow the user 214 to select one or more entities that are allowed to display ads or to otherwise market to and/or contact the user 214. The one or more selected entities may have exclusive access to the first device 230 for a given user 214. Alternatively, a third party such as a marketing entity, a transcription system, the user's professional(s), and/or other entity may be given access to control who may access advertising and marketing features. Other services may have access to the advertisement capability; for example, a notification server may advise the user 214 that a recertify to qualify for a transcription service at a reduced or no cost may be upcoming or due, that the user 214 is due for a hearing appointment, that the user 214 needs to take medication, etc. The first device 230 may provide entertainment such as movies, music, TV, radio, games (including videogames), news/weather/sports, and personal assistant functions such as answering questions, calendar access, reminders, shopping, etc.

In some embodiments, to protect privacy of the user 214, the first device 230 may process information available to the first device 230 and select products and services relevant to the user's likely preferences, then present advertisements or services for the selected products and services. The first device 230 may select from among multiple ads downloaded from a server or may anonymously select and download ads from a set of ads available on a remote server. Selection may use personal and private information. By giving the first device 230 responsibility for ad selection, personal and private information may remain local to the first device 230 and may not be shared with other providers. The first device 230 may report click rates to external servers and providers, response to ads where the user 214 requests more information and/or makes a purchase decision and/or otherwise interacts with the ad so that advertisers may be notified and may pay a referral fee. The first device 230 may report information anonymously or the first device 230 may provide personal identifying information.

In some embodiments, the first device 230 may be configured to detect hearing loss of a third-party associated with a device that is in communication with the first device 230. Detecting hearing loss of a third-party may use one or more methods described herein for detecting hearing loss of the user 214. In response to detecting the hearing loss of the third-party, the first device 230 may refer or invite the user 214 to refer, to the third-party, products and services related to hearing loss. In these and other embodiments, the first device 230 or another device may obtain a communication address and/or other information about the third-party. In these and other embodiments, the first device 230 and/or the other device may direct another system to establish a communication session with the device of the third-party to offer products and services related to hearing accommodation. Alternately or additionally, a physical address of the third-party may be obtained so a marketing system may mail the third-party an offer. Alternately or additionally, the user 214 may be invited to discuss hearing accommodations with the third-party.

Modifications, additions, or omissions may be made to the environment 200 and/or the components operating in the environment 200 without departing from the scope of the present disclosure. For example, the operations performed by the first device 230 may be distributed among multiple devices and/or systems such as remote servers and office management systems associated with audiologists or other professionals. Alternately or additionally, one or more of: the user characteristics 242, the settings 244, the speech characteristics 246, and the user input 248 may be distributed across one or more other devices and/or systems. For example, a transcription system may store the speech characteristics 246 and the first device 230 may store the user characteristics 242, the settings 244, and the user input 248. In these and other embodiments, the first device 230 and/or the transcription system may determine the first hearing level. As another example, the operations to determine the first and/or second hearing level of the user 214 and/or the adjustment to settings of the first device 230 and/or the transcription system may be performed by the first device or another device and/or system.

As another example, the methods performed by a professional may be performed by a system or device that is configured to perform operations that are analogous to those performed by a human professional such as an audiologist.

Figure 3:
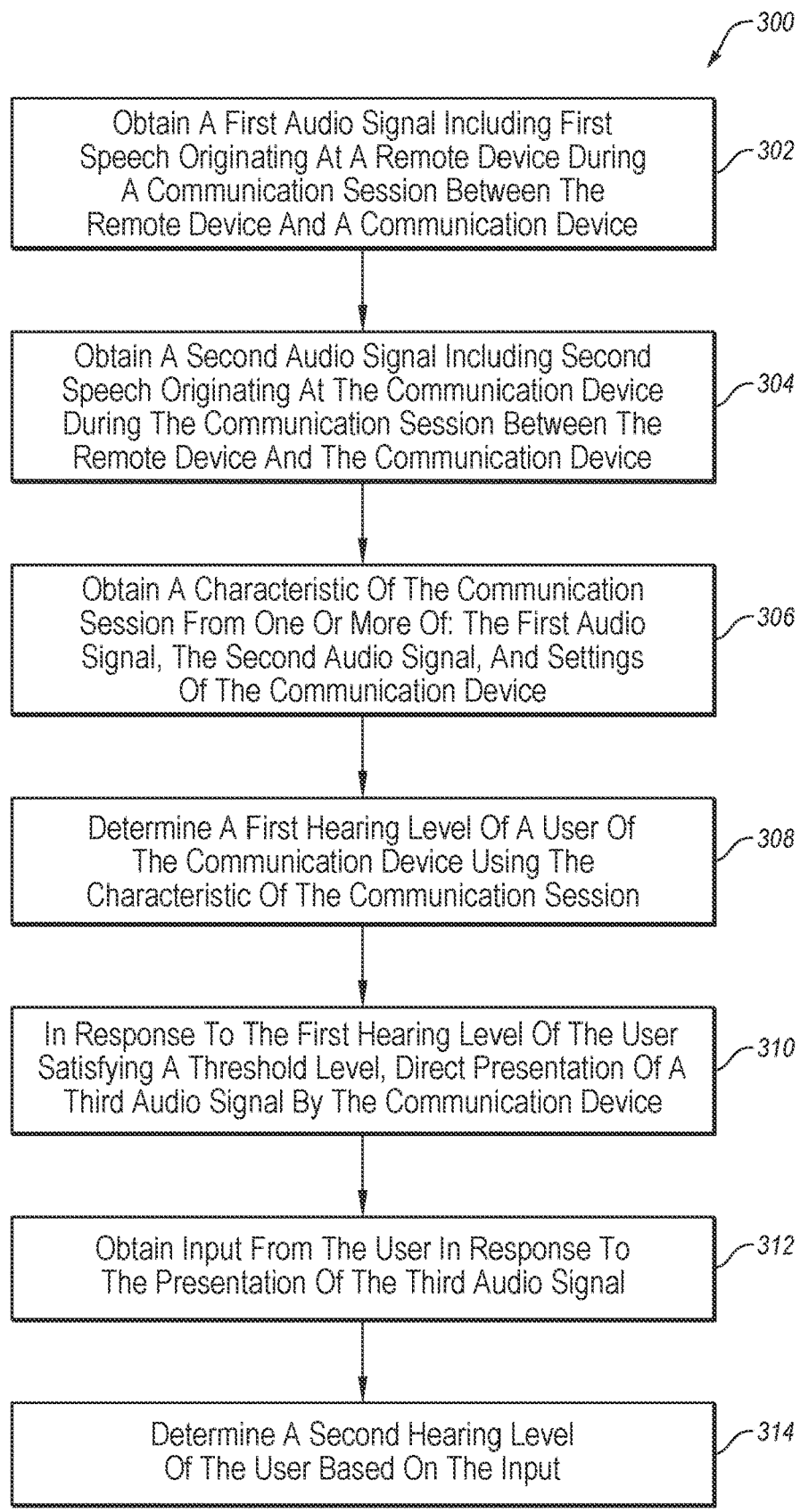
FIG. 3 is a flowchart of an example method to determine hearing levels of a user.

FIG. 3 is a flowchart of another example method 300 to determine hearing levels of a user. The method 300 may be arranged in accordance with at least one embodiment described in the present disclosure. The method 300 may be performed, in some embodiments, by a device or system, such as the first device 112 of FIG. 1, the first device 230 of FIG. 2, or another device. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where a first audio signal may be obtained. The first audio signal may include first speech originating at a remote device during a communication session between the remote device and a communication device.

At block 304, a second audio signal may be obtained. The second audio signal may include second speech originating at the communication device during the communication session between the remote device and the communication device.

At block 306, a characteristic of the communication session may be obtained from one or more of: the first audio signal, the second audio signal, and settings of the communication device.

At block 308, a first hearing level of a user of the communication device may be determined using the characteristic of the communication session. At block 310, in response to the first hearing level of the user satisfying a threshold level, presentation of a third audio signal may be directed by the communication device. At block 312, input from the user in response to the presentation of the third audio signal may be obtained. At block 314, a second hearing level of the user may be determined based on the input.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 300 may further include obtaining a user characteristic of the user of the communication device. In these and other embodiments, the first hearing level of the user may be further determined based on the user characteristic. The method 300 may also include providing the first audio signal to a transcription system configured to generate a transcription of the first audio signal. In these and other embodiments, the first hearing level of the user may be further determined based on the transcription of the first audio signal.

The method 300 may further include in response to determining the second hearing level satisfies a second threshold level, selecting a first setting of multiple settings of the communication device for adjustment. In these and other embodiments, the first setting of the multiple settings of the communication device may be selected in place of other settings of the multiple settings based on the second hearing level satisfying the second threshold level and not satisfying a third threshold level.

The method 300 may also include in response to the second hearing level satisfying a second threshold level, selecting a first setting of multiple settings of a transcription system that generates a transcription of audio for presentation by the communication device in substantially real-time during communications involving the communication device that generate the audio. In these and other embodiments, the first setting of the multiple settings of the transcription system may be selected instead of other settings of the multiple settings based on the second hearing level satisfying the second threshold level and not satisfying a third threshold level. In some embodiments, some or all of the operations described herein for determining first and second hearing levels may be combined into determining a single hearing level and one or more actions may be taken in response to the single hearing level, which actions correspond to actions described herein in response to the first and second hearing levels.

Figure 4:
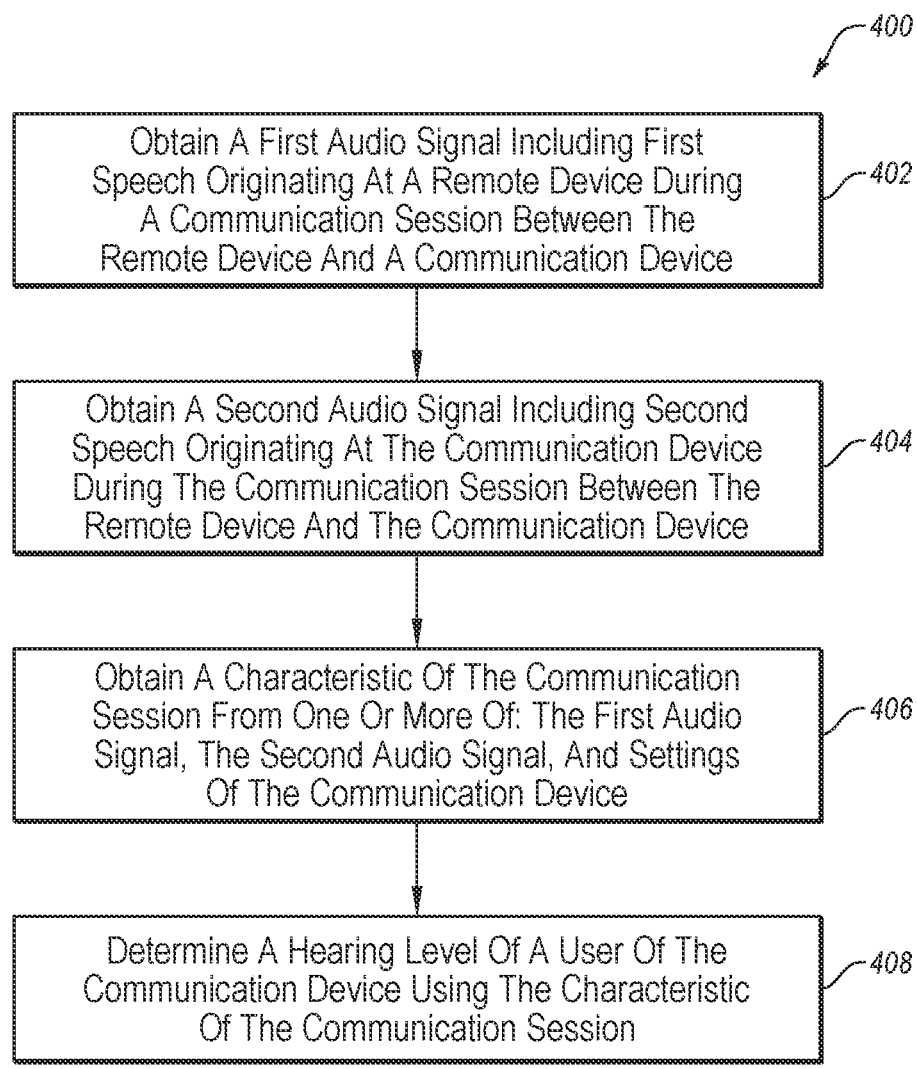
FIG. 4 is a flowchart of another example method to determine hearing levels of a user.

FIG. 4 is a flowchart of another example method 400 to determine hearing levels of a user. The method 400 may be arranged in accordance with at least one embodiment described in the present disclosure. The method 400 may be performed, in some embodiments, by a device or system, such as the first device 112 of FIG. 1, the first device 230 of FIG. 2, or another device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a first audio signal may be obtained. The first audio signal may include first speech originating at a remote device during a communication session between the remote device and a communication device.

At block 404, a second audio signal may be obtained. The second audio signal may include second speech originating at the communication device during the communication session between the remote device and the communication device At block 406, a characteristic of the communication session may be obtained from one or more of: the first audio signal, the second audio signal, and settings of the communication device. At block 408, a hearing level of a user of the communication device may be determined using the characteristic of the communication session.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include obtaining a user characteristic of the user of the communication device. In these and other embodiments, the hearing level of the user may be further determined based on the user characteristic of the user.

The method 400 may also include providing the first audio signal to a transcription system configured to generate a transcription of the first audio signal. In these and other embodiments, the hearing level of the user may be further determined based on the transcription of the first audio signal. The method 400 may further include in response to determining the hearing level satisfies a threshold level, selecting a first setting of multiple of settings of the communication device for adjustment. In these and other embodiments, the first setting of the multiple settings of the communication device being selected in place of other settings of the multiple settings based on the hearing level satisfying the threshold level and not satisfying a second threshold level.

In these and other embodiments, the multiple settings of the communication device may include: amplification level of broadcast audio, presentation of a substantially real-time summary of a transcription of audio of a communication, presentation of a summary of a transcription of audio at the end of a call, presentation of images of a human mouth that mimic mouth movements that produce speech of the audio of the communication, extending the audio bandwidth or otherwise enhancing the audio, application of a parameter to the audio of the communication to reduce distortion of the audio, among other settings.

The method 400 may further include in response to the hearing level satisfying a threshold level, requesting a transcription of audio for presentation by the communication device in substantially real-time during communications involving the communication device that generate the audio.

The method 400 may also include in response to the hearing level satisfying a threshold level, selecting a first setting of multiple settings of a transcription system that generates a transcription of audio for presentation by the communication device in substantially real-time during communications involving the communication device that generate the audio. In these and other embodiments, the first setting of the multiple settings of the transcription system may be selected instead of other settings of the multiple settings based on the hearing level satisfying the threshold level and not satisfying a second threshold level.

In these and other embodiments, each setting of the multiple settings may correspond to a different one of multiple processes used by the transcription system to generate the transcription of the audio. In these and other embodiments, the processes used by the transcription system to generate the transcription of the audio may include: a revoicing transcription process, an automated transcription process, a combination of revoicing and automated transcription process, among other processes.

The method 400 may further include in response to the hearing level of the user satisfying a threshold level, directing presentation of a third audio signal by the communication device, obtaining input from the user in response to the presentation of the third audio signal, and determining a second hearing level of the user based on the input. In these and other embodiments, determining the second hearing level of the user may be further based on the hearing level.

The method 400 may also include in response to determining the second hearing level satisfies a second threshold level, selecting a first setting of multiple settings of the communication device for adjustment. In these and other embodiments, the first setting of the multiple settings of the communication device may be selected in place of other settings of the multiple settings based on the second hearing level satisfying the second threshold level and not satisfying a third threshold level.

The method 400 may further include in response to the second hearing level satisfying the second threshold level, selecting a setting of multiple settings of a transcription system that generates a transcription of audio for presentation by the communication device in substantially real-time during communications involving the communication device that generate the audio. In these and other embodiments, the first setting of the multiple settings of the transcription system may be selected instead of other settings of the multiple settings of the transcription system based on the second hearing level satisfying the second threshold level and not satisfying the third threshold level.

Figure 5:
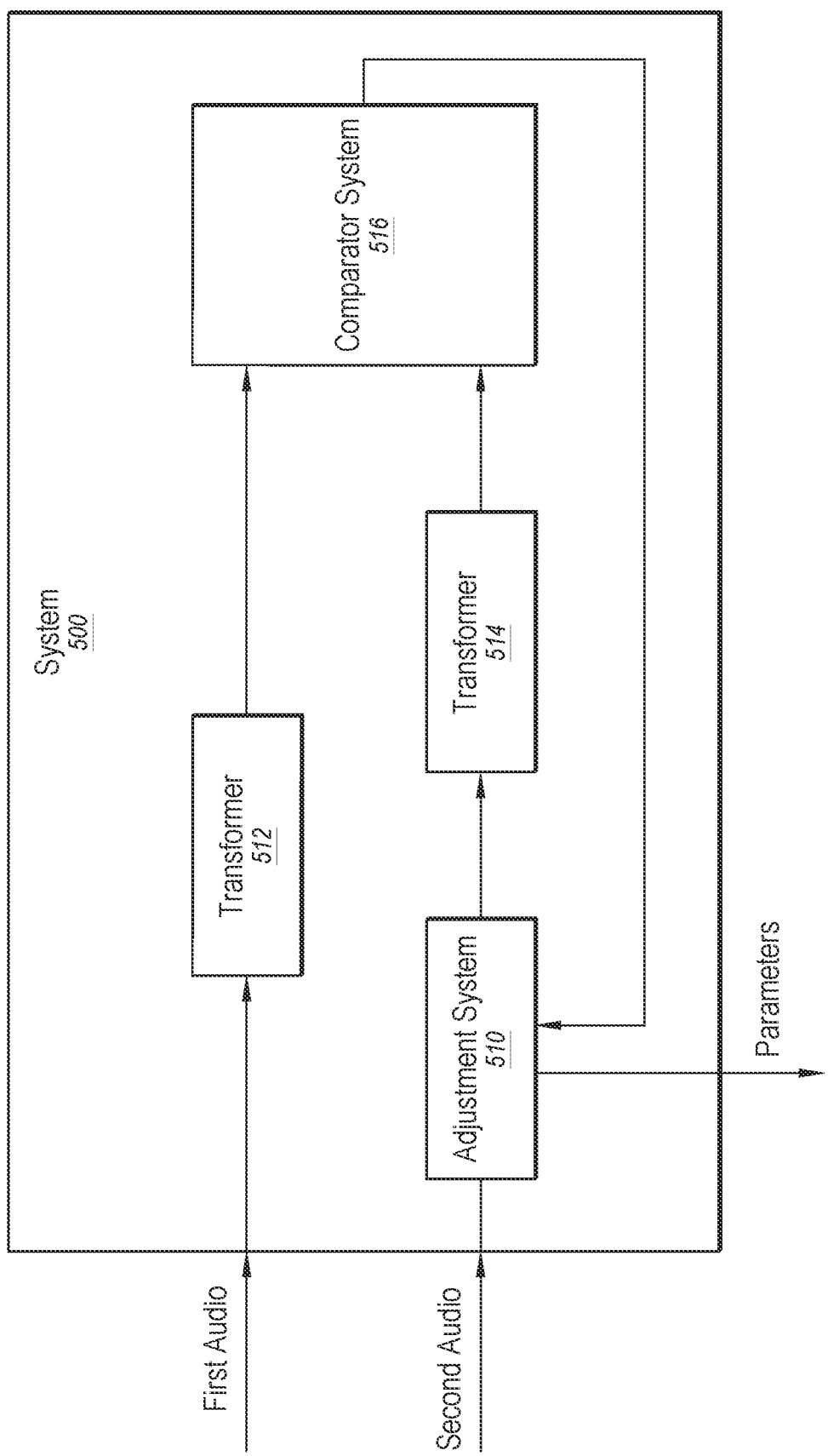
FIG. 5 illustrates an example system for audio adjustment.

FIG. 5 illustrates an example system 500 for audio adjustment. The system 500 may be arranged in accordance with at least one embodiment described in the present disclosure. The system 500 may include an adjustment system 510, a transformer 512, a transformer 514, and a comparator system 516.

Audio that is transmitted between devices during a communication session may have reduced quality due to factors that affect the audio during the transmission of the audio among other factors. In these and other embodiments, a quality of audio may refer to an ability of a person hearing audio to understand speech in the audio. Thus, an increase in the quality of the audio may increase an ability of a person hearing the audio to understand the speech in the audio.

The factors that may reduce the quality of the audio may be referred to in this disclosure as impairments of audio. During a communication session between devices, the audio transmitted may be affected by various impairments. Some impairments may include ambient noise or noise generated by the communication network; reverberations, which may be caused by acoustic echoes in a room; limited bandwidth of the communication network; the sampling rate of the audio; artifacts generated by noise reduction technology in a device participating in the communication session that is used to attenuate background noise; packet loss; attenuation of the signal, such as fading; packet dropouts; data transmission errors; and artifacts/distortions caused by signal compression by a device participating in the communication session, among other factors that may affect audio during transmission. Other impairments of the audio that may decrease the ability of a person to understand speech in the audio may include the speech having a strong accent, being slurred, or otherwise not being clear.

In some embodiments, the system 500 may be configured to generate parameters that may be used to adjust audio. In these and other embodiments, the adjustment to the audio may increase a quality of the audio by compensating for impairments that affect the audio. For example, the system 500 may implement noise reduction to reduce the effects of noise, automatic gain control to boost quiet portions of the audio, accent transformation to reduce the effects of a speaker with an accent, bandwidth extension to restore frequency bands of a signal lost in the communication network, intelligibility enhancement to transform the audio signal into a format that is more easily understood, rate modification to speed up or slow down portions of the audio, and amplification. As an example, the communication network may band-limit the audio to a maximum frequency such as 4 kHz. Bandwidth extension may use audio below the maximum frequency to construct an estimate of the audio above the maximum frequency, combine the audio below the maximum frequency with the audio above the maximum frequency to construct an audio signal with wider bandwidth, and present the wider bandwidth audio to a user. Bandwidth extension may similarly be used to reconstruct audio removed by the communication network below a minimum frequency. Bandwidth extension may use one or more of neural networks, generative adversarial networks, random number generators, filters, inverse filters, and spectral smoothing. The system 500 may be configured to generate the parameters based on differences between first audio and second audio as explained below.

In some embodiments, to generate the parameters, the system 500 may obtain the first audio and the second audio. The first audio may include speech, such as a words spoken by a human. The second audio may include the same speech as the first audio. The second audio may be different from the first audio in that the second audio may be affected by one or more impairments. The first and second audio may be generated in various manners. Various examples of the generation of the first and second audio are now provided.

In a first example, audio may be generated by a microphone that captures the speech of a person. The audio generated by the microphone may be the first audio. The audio generated by the microphone may be applied to a network or a network simulator that is configured to apply impairments to audio that simulate impairments that may be applied to audio by a physical communication network. The audio output by the network simulator may be the second audio.

In a second example, the first audio may be generated based on speech of a first speaker. The first audio may be directed to the system 500 such that minimal or no impairments are applied to the audio. The second audio may be generated based on speech of a second speaker. Words in the speech of the second speaker may be the same as words of the speech of the first speaker. The second audio may be transmitted over a physical communication network. As the second audio is transmitted over the communication network, impairments may be applied to the second audio. In these and other embodiments, the first speaker and the second speaker may be the same or different people.

In a third example, the second audio may be generated based on speech of a second speaker. The second audio may be transmitted over a physical communication network or applied to a network simulator such that impairments are applied to the second audio. The second audio may be broadcast to a first speaker. The first speaker may revoice the broadcast second audio. A microphone may generate the first audio based on the revoiced speech of the first speaker.

The second audio may be provided to the adjustment system 510. The adjustment system 510 may be configured to adjust the second audio to generate adjusted second audio. The second audio may be adjusted to partially remove or remove one or more of the impairments applied to the second audio. As such, the adjusted second audio may be more analogous to the first audio than the second audio is to the first audio as received by the system 500. In these and other embodiments, the adjustment system 510 may adjust one or more of amplitude, frequency, wavelength, pitch, timbre, intensity, duration, tone, bandwidth, noise level, accent, among other aspects of the second audio to generate the adjusted second audio.

The adjustment system 510 may adjust the second audio based on one or more parameters. The adjustment system 510 may determine the parameters based on differences between the adjusted second audio and the first audio as determined by the comparator system 516. For example, the adjustment system 510 may use a neural network or other machine learning algorithm to generate the parameters that may be part of a machine learning model. The machine learning model may be trained and the parameters generated using the differences between the first audio and the adjusted second audio as determined by the comparator system 516. Alternately or additionally, the adjustment system 510 may use stochastic gradient descent and/or back propagation algorithms to generate the parameters based on the differences between the first audio and the adjust second audio provided by the comparator system 516.

For example, the first audio and the second audio from multiple different conversations that include speech may be provided to the system 500. The adjustment system 510 may adjust the second audio based on the current parameters. Based on the second audio and the differences between the adjusted second audio and the first audio identified by the comparator system 516, the adjustment system 510 may adjust the parameters. For example, suppose that the first audio at a first frequency includes a first amplitude and the second audio at the first frequency includes a second amplitude. The comparator system 516 may determine a difference between the first amplitude and the second amplitude and provide the difference to the adjustment system 510. The adjustment system 510 may set a parameter to adjust the amplitude of the first frequency in the second audio based on the difference. For example, based on the difference, the adjustment system 510 may determine that the amplitude at the first frequency is increased by twenty percent. Based on the parameters, when adjusting the second audio in the future the adjustment system 510 may adjust the amplitude of the second audio at the first frequency such that it matches the amplitude of the first audio at the first frequency. The adjustment system 510 may provide the parameters to one or more other systems that may use the parameters to adjust audio. Further description regarding use of the parameters is described with respect to FIG. 6.

The transformer 512 may be configured to transform the first audio into transformed first audio. The transformed first audio may be provided to the comparator system 516. The transformer 514 may be configured to transform the adjusted second audio into transformed second audio. The transformed second audio may be provided to the comparator system 516. The transformation performed by the transformer 512 may be same as the transformation performed by the transformer 514. The type of transformation performed by the transformer 512 and the transformer 514 may vary based on the comparator system 516 and the adjustment system 510. In some embodiments, the transformer 512 and the comparator system 516 may transform the first audio and the adjusted second audio, respectively, into magnitude spectra. Alternately or additionally, the transformer 512 and the comparator system 516 may use a speech recognizer that determines the probability that the first audio and the adjusted second audio correspond to a given phoneme. In these and other embodiments, the transformer 512 and the comparator system 516 may each output a vector of probabilities regarding the first audio and the adjust second audio corresponding to a given phoneme. Alternately or additionally, the system 500 may not include the transformer 512 and/or the transformer 514.

The comparator system 516 may be configured to obtain the transformed first audio and the transformed second audio. The comparator system 516 may be configured to compare the transformed first audio and the transformed second audio to determine a difference between the transformed first audio and the transformed second audio. The comparator system 516 may provide the difference to the adjustment system 510. For example, the difference determined by the comparator system 516 may be an average or total squared difference between the transformed first audio and the transformed second audio. Alternately or additionally, when the transformed first audio and the transformed second audio are vectors regarding the probability of the first audio and the adjusted second audio representing a particular phoneme, the comparator system 516 may determine a difference between the two vectors and provide the difference to the adjustment system 510. Alternately or additionally, the comparator system 516 may determine a cost or loss function such as cross entropy, cosine distance, sum of absolute error, connectionist temporal classification (CTC), among other cost or loss functions.

Modifications, additions, or omissions may be made to the system 500 and/or the components operating in the system 500 without departing from the scope of the present disclosure. For example, in some embodiments, the system 500 may include a method to align the first audio and the adjusted second audio. For example, between the transformer 512 and the comparator system 516 a time aligner may delay the transformed first audio such that the transformed first audio is time aligned with the transformed second audio.

Figure 6:
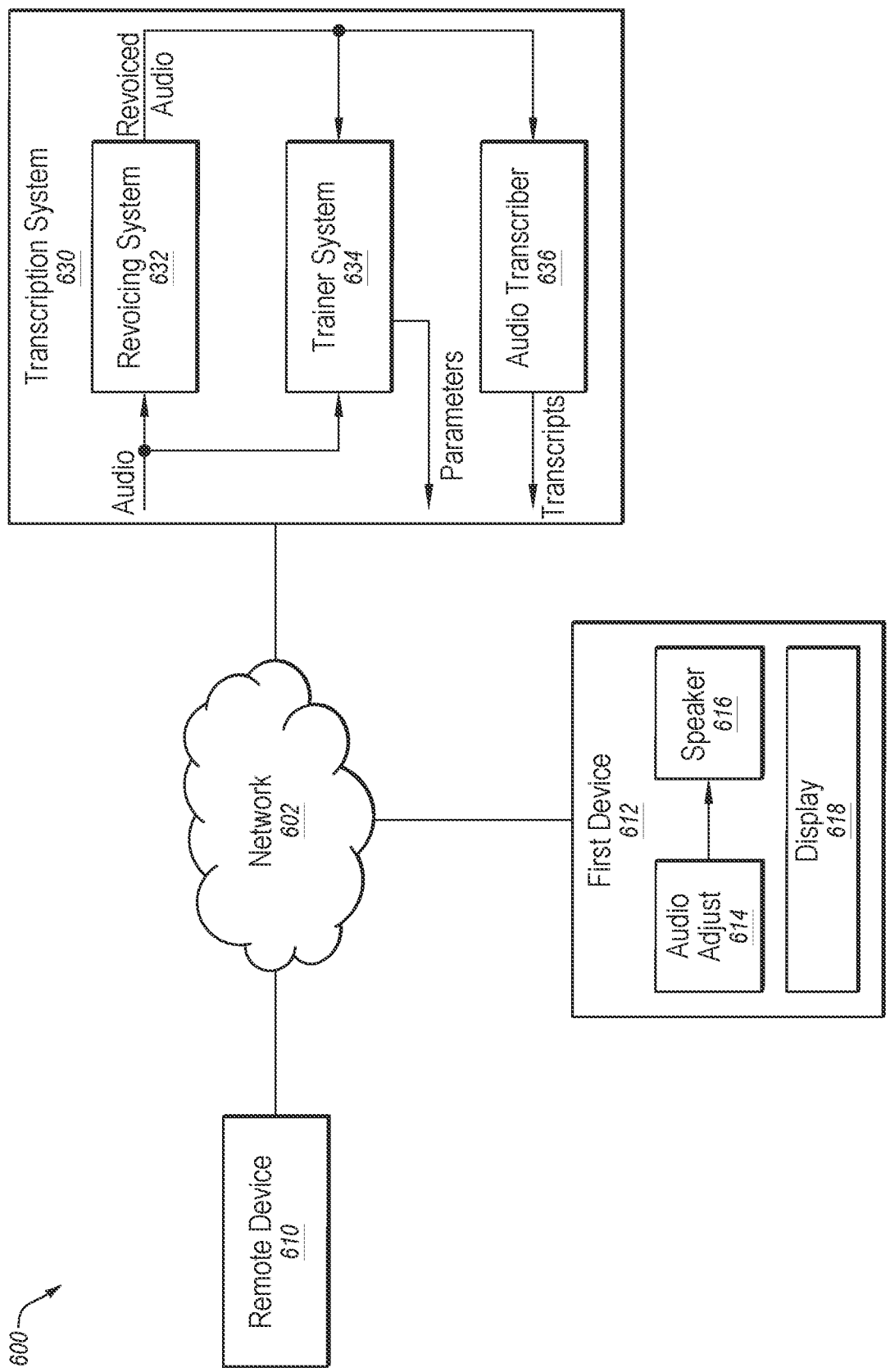
FIG. 6 illustrates an example environment for audio adjustment.

FIG. 6 illustrates an example environment 600 for audio adjustment. The environment 600 may be arranged in accordance with at least one embodiment described in the present disclosure. The environment 600 may include a network 602, a remote device 610, a first device 612, and a transcription system 630.

The remote device 610, the first device 612, and the transcription system 630 may be analogous in general operation to the remote device 110, the first device 112, and the transcription system 130 of FIG. 1. Accordingly, a general description regarding these elements is not provided with respect to FIG. 6.

The transcription system 630 may include a revoicing system 632, a trainer system 634, and an audio transcriber 636. The transcription system 630 may be configured to obtain audio from either the remote device 610, the first device 612, or both the remote device 610 and the first device 612 that is part of a communication session between the remote device 610 and the first device 612. For example, the remote device 610 may obtain the audio and direct the audio the first device 612. The first device 612 may obtain the audio from the remote device 610 and direct the audio to the transcription system 630. The transcription system 630 may provide the audio to the revoicing system 632 and the trainer system 634.

The revoicing system 632 may be configured to obtain revoiced audio of the audio. The revoiced audio may be a revoicing of the audio. For example, the revoicing system 632 may present the audio to a person such that the person hears words in the audio. The person may speak the words that the person hears. The speech of the person reciting the words from the audio may be captured by a microphone to generate revoiced audio. The revoicing system 632 may provide the revoiced audio to the trainer system 634 and the audio transcriber 636.

The trainer system 634 may be analogous to the system 500 of FIG. 5. In these and other embodiments, the trainer system 634 may be configured to generate parameters that may be used to remove impairments in the audio received by the transcription system 630. The trainer system 634 may use the audio received by the transcription system 630 as the first audio and the revoiced audio as the second audio to generate the parameters. In some embodiments, the trainer system 634 may provide the parameters to the first device 612.

In some embodiments, the trainer system 634 may generate new parameters based on one or more communication sessions associated with the first device 612. In these and other embodiments, for some or all audio received by the transcription system 630 from the first device 612, the trainer system 634 may generate new parameters. The new parameters may be provided to the first device 612 during the communication session as the new parameters are developed. Alternately or additionally, the trainer system 634 may send the parameters to the first device 612 after the end of the communication session. In these and other embodiments, the first device 612 may use the parameters from a previous communication session in a current communication session.

In some embodiments, the trainer system 634 may generate the parameters but not send the parameters to the first device 612 until the parameters result in a difference between the audio and the revoiced audio that is less than a threshold. In these and other embodiments, the trainer system 634 may not send parameters to the first device 612 until the difference between the audio and the revoiced audio satisfies a threshold. In these and other embodiments, the trainer system 634 may at some interval check, such as a random or periodic interval, or may continually check the difference between the audio and the revoiced audio. If the difference satisfies a threshold, the trainer system 634 may generate new parameters and provide the new parameters to the first device 612. Alternately or additionally, the trainer system 634 may at some interval generate parameters, such as a random or periodic interval, or continually generate parameters. In these and other embodiments, the trainer system 634 may provide the parameters to the first device 612 in response to change in the current parameters and the parameters previously provided to the first device 612 satisfying a threshold.

In some embodiments, the trainer system 634 may generate parameters for the first device 612 using only audio obtained from the first device 612 that is directed to the first device 612 from other devices, such as the remote device 610. Alternately or additionally, the trainer system 634 may generate parameters for the first device 612 using only audio obtained from another device or a combination of audio from the first device 612 and other devices.

In some embodiments, the first device 612 may provide an indication of the origin of the audio to the transcription system 630. In these and other embodiments, the transcription system 630 may be configured to generate parameters for each origin of audio that is obtained by the first device 612. For example, the trainer system 634 may generate first parameters for audio that originates at the remote device 610 and second parameters for audio that originates at another device. In these and other embodiments, the first device 612 be configured to use the parameters generated by the audio originating at the device for which current audio is being received. For example, the first device 612 may use the first parameters when obtaining audio from the remote device 610 and use the second parameters when obtaining audio from another device.

The audio transcriber 636 may be configured to generate a transcription of the revoiced audio. The audio transcriber 636 may generate the transcription using an ASR system. The transcription of the revoiced audio may be provided to the first device 612.

The first device 612 may obtain the audio during the communication session. The first device 612 may also be configured to obtain the parameters and the transcription. The first device 612 may include an audio adjust 614, a speaker 616, and a display 618.

The audio adjust 614 may obtain the audio of the communication session and the parameters. The audio adjust 614 may be configured to adjust the audio based on the parameters to generate adjusted audio. The adjusted audio may be provided to the speaker 616. The speaker 616 may present the adjusted audio to a user of the first device 612. The adjusted audio may be easier for the user to understand than the audio based on the partial or complete removal of one or more impairments applied to the audio by the remote device 610, the first device 612, and/or the network 602 as the audio is provided to the first device 612 from the remote device 610. The display 618 may be configured to present the transcription from the transcription system 630 and present the transcription substantially aligned with the presentation of the adjusted audio by the speaker 616. The transcription being substantially aligned may indicate that a time difference between when a word in the audio is presented and when the corresponding word in the transcription is presented is less than twenty seconds.

In some embodiments, the audio adjust 614 may be configured to consider additional data when adjusting the audio. In these and other embodiments, the audio adjust 614 may adjust the audio based on the data instead of using the parameters from the trainer system 634. Alternately or additionally, the audio adjust 614 may adjust the audio based on the data and the parameters from the trainer system 634.

For example, in some embodiments, the data used by the audio adjust 614 to adjust the audio may include a type of equipment and network used during the communication session. For example, the type of equipment may include whether the remote device 610 is a mobile phone, tablet, smart speaker, landline, speakerphone, videophone, or VoIP phone and/or a particular model of each of the devices. Alternately or additionally, the data may include a nature of background noise; background noise level; audio quality, such as standard POTS telephone quality, mobile phone quality; high definition voice; voice of Long-Term-Evolution (LTE) networks; speaker demographics; among others.

In some embodiments, the data used by the audio adjust 614 may be associated with the user of the first device 612. For example, the data may include the hearing level of the user, such as an audiogram of the user, user demographics, user use of a hearing-aid, and/or a type of the hearing-aid used. As another example, the data may include a type of the speaker 616, such as the speaker being part of a handset, a speakerphone, a videophone, a PC or laptop, a smart speakers, a hearing aid, a hearing loop, a TV, a mobile phone, an ear bud, a cochlear implant, headphone on one ear, headphones on both ears, etc.

In some embodiments, the audio adjust 614 may be configured to perform one or more types of actions to the audio in addition to or in place of applying the parameters to the audio. For example, in some embodiments, the first device 612 may be associated with a user. The first device 612 may include an audiogram that defines hearing loss of the user. In these and other embodiments, the audio adjust 614 may be configured to adjust the audio based on the audiogram of the user.

Alternately or additionally, the audio adjust 614 may include an echo cancellation and/or suppression mechanism that may be configured to remove echoes from the audio. The echoes may result from systems and devices in the communication network or from the remote device 610 being in a small room with hard walls and floors. Alternately or additionally, the audio adjust 614 may be configured to shift the spectrum of the audio from the band at which it is received to a different band corresponding to frequencies the user is more able to hear.

Alternately or additionally, the audio adjust 614 may be configured to perform an increase of amplitude of certain sounds in the audio. For example, the audio adjust 614 may be configured to increase an amplitude of a first class of sounds and as compared to a second class of sounds. For example, the first class of sounds may be consonants and the second class of sounds may be vowels. Alternately or additionally, the audio adjust 614 may be configured to increase a duration of a first class of sound and decrease a duration of a second class of sounds. For example, the first class of sounds may be unvoiced speech or speech where the spectrum is rapidly changing and the second class of sounds may be voiced speech or relatively steady-state speech. Alternately or additionally, the first class of sounds may be all speech sounds and the second class of sound may be silence such that the first class of sounds is presented during the second class of sounds.

Alternately or additionally, the audio adjust 614 may be configured to perform other types of amplification, including limit peak power of the audio by amplitude compression and/or amplitude limiting. In these and other embodiments, the audio adjust 614 may limit the amplification of certain frequencies and not other frequencies. For example, the audio adjust 614 may limit the amplitude of the frequencies with the highest amplitude and not limit the amplitude of other frequencies. For example, lower harmonics of the audio may be attenuated but higher harmonics of the audio may not be attenuated.

Alternately or additionally, the audio adjust 614 may be configured to adjust the phase and spectral features of the audio so that energy output of the audio may be increased without increasing peak amplitude of the audio. For example, the audio adjust 614 may use a filter to process the audio where the amplitude response is relatively flat across the frequency spectrum of the audio but the phase response is modified so that the waveform peaks tend to be reduced. Alternately or additionally, the audio adjust 614 may be configured to detect which of multiple voices are background voices. The audio adjust 614 may be configured to determine the differences between voices based on the frequency spectrum of the voices. In these and other embodiments, the audio adjust 614 may determine the background voice based on the background voice including an average lower amplitude than a foreground voice. In these and other embodiments, the audio adjust 614 may be configured to remove or attenuate the background voice by attenuating frequencies corresponding to the background voice.

Modifications, additions, or omissions may be made to the environment 600 and/or the components operating in the environment 600 without departing from the scope of the present disclosure. For example, in some embodiments, the speaker 616 and/or the display 618 may be separate from the first device 612. In these and other embodiments, the first device 612 may obtain the audio and the transcription and generate the adjusted audio. The first device 612 may provide the transcription to the display 618 for presentation. The first device 612 may also provide the adjusted audio to the speaker 616 for presentation.

As another example, in some embodiments, the audio adjust 614 may be provided in the transcription system 630. In these and other embodiments, the audio adjust 614 may be provided before the audio is provided to the revoicing system 632. In these and other embodiments, the audio adjust 614 may adjust the audio that is presented for revoicing.

As another example, the transcription system 630 may not include the revoicing system 632. In these and other embodiments, the audio may be provided to the audio transcriber 636 and the transcription system 630 may generate the first and the second audio for the trainer system 634 using other methods as described with respect to FIG. 5. In these and other embodiments, the transcription system 630 may also include the audio adjust 614. The audio adjust 614 may be configured to adjust the audio before the audio is provided to the audio transcriber 636. In these and other embodiments, the audio adjust 614 may adjust the audio for the ASR system in the audio transcriber 636.

In some embodiments, the trainer system 634 may not be part of the transcription system 630. In these and other embodiments, the trainer system 634 may be part of another system or device that may provide the parameters to the first device 612. Alternately or additionally, the trainer system 634 may be part of the first device 612. In some embodiments, the trainer system 634 may be used to generate parameters prior to a communication session. In some embodiments, the trainer system 634 may be used to generate parameters during a communication session.

Figure 7:
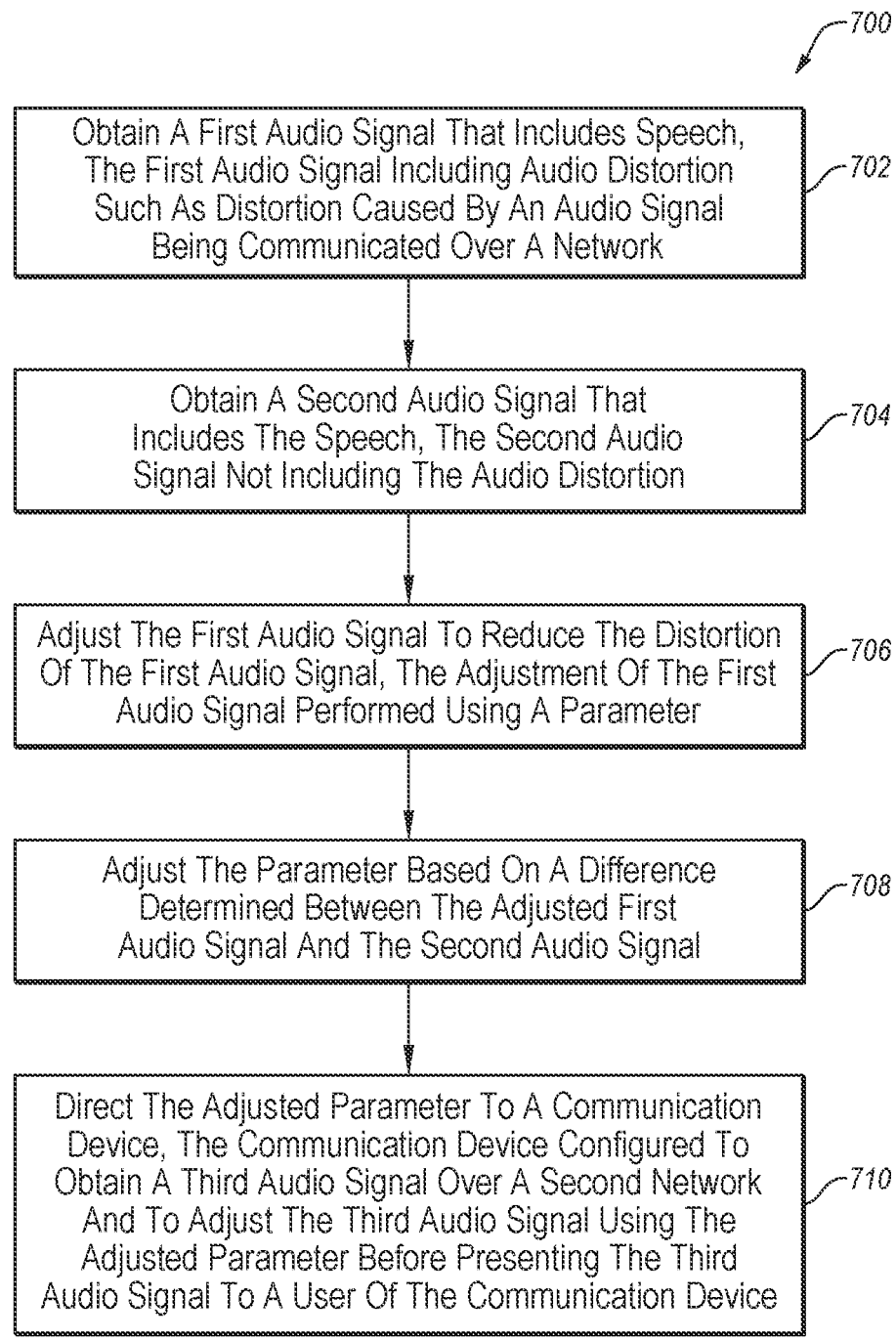
FIG. 7 is a flowchart of an example method to adjust audio.

FIG. 7 is a flowchart of another example method 700 to adjust audio. The method 700 may be arranged in accordance with at least one embodiment described in the present disclosure. The method 700 may be performed, in some embodiments, by a device or system, such as the first device 112 of FIG. 1, the first device 230 of FIG. 2, the system 500 of FIG. 5, first device 612 of FIG. 6, or another device or system described in this disclosure. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 700 may begin at block 702, where a first audio signal that includes speech may be obtained. In these and other embodiments, the first audio signal may include audio distortion such as distortion caused by an audio signal being communicated over a network. In some embodiments, the audio distortion of the first audio signal may be included in the first audio signal by the first audio signal being communicated over the network. In some embodiments, the audio distortion of the first audio signal may be included in the first audio signal by the first audio signal being applied to a network simulator.

At block 704, a second audio signal that includes the speech may be obtained. In these and other embodiments, the second audio signal may not include the audio distortion. In some embodiments, the second audio signal may be a revoicing of the first audio signal. In these and other embodiments, the first audio signal may originate from a second communication device and may be obtained from the second communication device. In some embodiments, the first audio signal and the second audio signal may originate from a voice signal that includes the speech.

At block 706, the first audio signal may be adjusted to reduce the distortion of the first audio signal. In these and other embodiments, the adjustment of the first audio signal may be performed using a parameter.

At block 708, the parameter may be adjusted based on a difference determined between the adjusted first audio signal and the second audio signal. In some embodiments, the second audio signal and the adjusted first audio signal may be time aligned before the difference is determined between the adjusted first audio signal and the second audio signal. In some embodiments, the second audio signal and the adjusted first audio signal may be transformed before the difference is determined between the adjusted first audio signal and the second audio signal.

At block 710, the adjusted parameter may be directed to a communication device. In these and other embodiments, the communication device may be configured to obtain a third audio signal over a second network and to adjust the third audio signal using the adjusted parameter before presenting the third audio signal to a user of the communication device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 700 may further include generating a transcript of the speech of the first audio signal using the second audio signal in substantially real-time and directing the transcript of the speech to the communication device, the communication device configured to present the transcript in substantially real-time with the presentation of the first audio signal.

Figure 8:
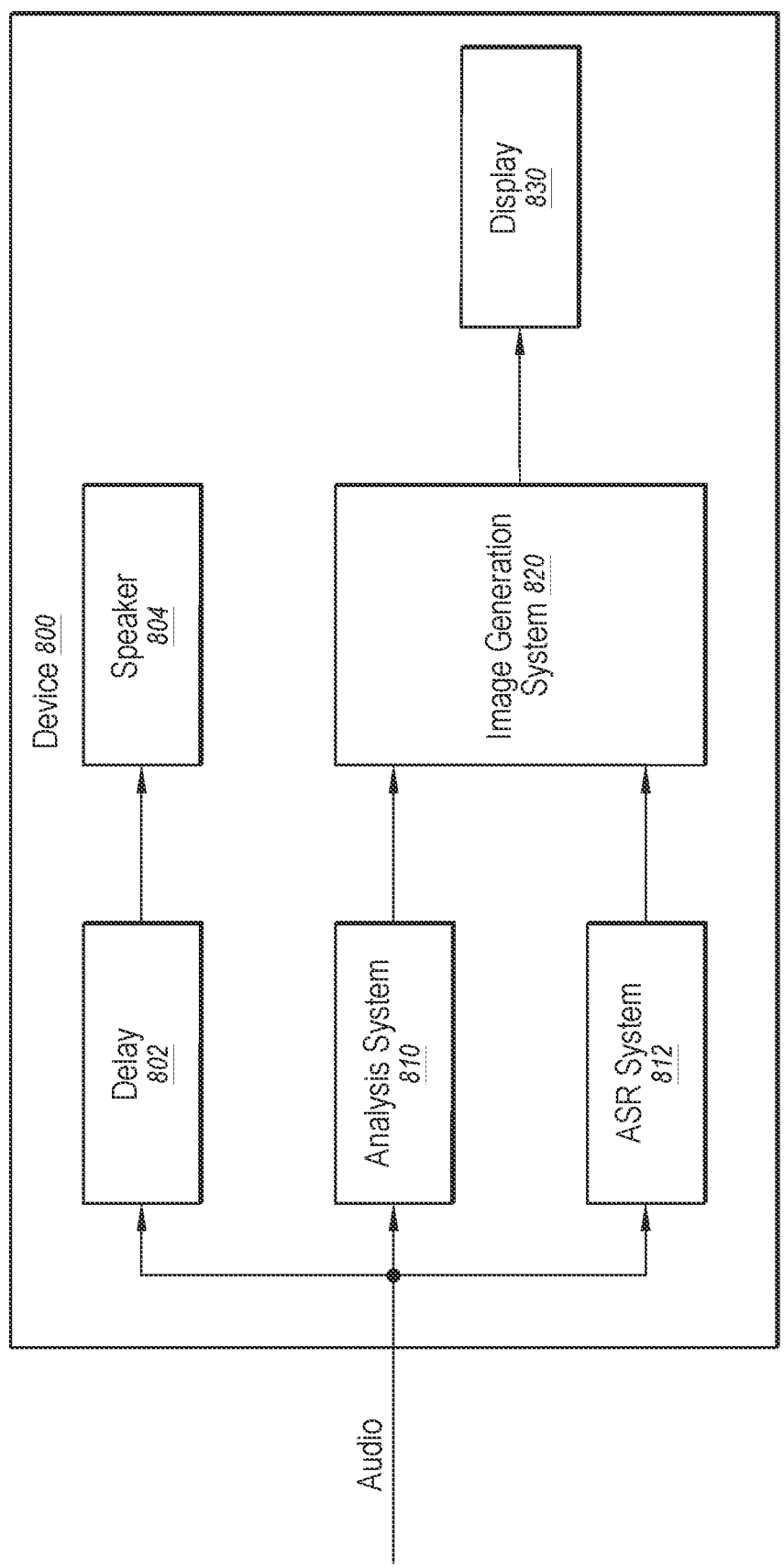
FIG. 8 illustrates an example mouth image presentation device.

FIG. 8 illustrates an example mouth image presentation device 800. The device 800 may be arranged in accordance with at least one embodiment described in the present disclosure. The device 800 may include a delay 802, a speaker 804, an analysis system 810, an ASR system 812, an image generation system 820, and a display 830.

In general, the device 800 may be configured to receive audio that includes speech, for example spoken words. The device 800 may synthesize images that include a human mouth speaking the spoken words in real-time or substantially real-time and present the audio in real-time or substantially real-time along with the images that include the human mouth.

In some embodiments, the audio received by the device 800 may be audio from a communication session between the device 800 and a remote device. In these and other embodiments, the audio may originate at the remote device and be communicated to the device 800. In these and other embodiments, the audio may include speech of a user of the remote device. For example, the user of the remote device may speak words that are captured by a microphone to generate the audio that is communicated to the device 800. In these and other embodiments, the device 800 may be configured to generate images that include a human mouth that may mimic mouth movements of a mouth of the user of the remote device when the user of the remote device speaks the words that are included in the audio obtained by the device 800.

In some embodiments, the audio presented to the trainer system 920 may be a combination of first audio from the remote device and second audio from the device 800. An echo canceller and/or suppressor may be used to remove at least part of the second audio so that the human mouth responds more to the first audio than to the second audio. In some embodiments, the trainer system 920 may be configured to detect when a user of the device 800 is speaking and when another participant in the communication session is speaking and to hold the lips still when the user is speaking and the other participant is not speaking.

In some embodiments, the device 800 may be an example of the first device 112 of FIG. 1. The remote device may be an example of the remote device 110 of FIG. 1. In these and other embodiments, the remote device may send the audio over the network 102 to the device 800. The device 800 may use the audio as described with respect to FIG. 8 to synthesize images that include a human mouth speaking the speech from the audio and present the images and the audio. In these and other embodiments, the device 800 may also be configured to obtain a transcription of the audio. The device 800 may present the transcription of the audio, the images, and the audio on the display 830.

Alternately or additionally, the audio may be part of a recorded audio that includes speech. For example, the audio may be a recorded message, such as a voice message left when a user of the device 800 does not establish a communication session with an incoming communication request. Alternately or additionally, the audio may be recorded or live and may originate from a disclosure, presentation, class, podcast or some other form of audio that includes speech that is recorded or live, such as a radio, television, or streaming broadcasts.

In some embodiments, the audio obtained by the device 800 may be provided to the delay 802, the analysis system 810, and the ASR system 812. The analysis system 810 may be configured to analyze the audio. The analysis of the audio may include determining different aspects of the audio. The analysis of the audio may be performed using a Fourier transform of the audio. For example, the audio may be in digital form. Using the digital information, a Fourier transform of the audio may be performed.

In some embodiments, analysis of the audio may include determining an overall energy of the audio. Alternately or additionally, analysis of the audio may include determining energy of first frequencies as compared to second frequencies of the audio signal. For example, a comparison, such as a ratio, of the energy of frequencies above a particular frequency and the energy of frequencies below the particular frequency may be determined. In these and other embodiments, the particular frequency may be a mid-frequency of human speech. For example, the particular frequency may be between 1.0 KHz and 5 KHz, such as 1.6 KHz, 2.0 KHz, 2.5 KHz, 3.0 KHz, 3.5 KHz, 4.0 KHz, and 4.5 KHz, among other frequencies.

Alternately or additionally, analysis of the audio may include determining spectral features of the audio. The spectral features of the audio may be determined by converting the audio in the time domain to the frequency domain using a Fourier transform. The spectral features of the audio determined may include one or more of the following: fundamental frequency, frequency components, spectral centroid, spectral flux, spectral density, and spectral roll-off, among others. Alternately or additionally, the analysis of the audio may be based on a set of spectral coefficients of the audio. For example, the spectral coefficients may include linear prediction coefficients or mel-frequency coefficients, among others. The analysis system 810 may provide the analysis of the audio to the image generation system 820.

In some embodiments, the ASR system 812 may be configured to determine aspects of the speech in the audio. For example, the ASR system 812 may be configured to determine phonemes of the speech and/or the words of the speech. The ASR system 812 may use any method to determine the phonemes or words, such as those described in U.S. patent application Ser. No. 16/209,623 filed on Dec. 4, 2018, incorporated herein by reference, or other methods. The ASR system 812 may provide aspects of the speech to the image generation system 820.

In some embodiments, the image generation system 820 may be configured to determine human mouth movements that generate the speech in the audio signal based on the analysis provided by the analysis system 810 and/or the aspects of the speech provided by the ASR system 812. In these and other embodiments, the image generation system 820 may be configured to synthesize images that include a human mouth using the determined human mouth movements. The images that include the human mouth may include the human mouth mimicking mouth movements that may produce the speech of the audio.

In some embodiments, synthesizing images by the image generation system 820 may include the image generation system 820 drawing images of a human mouth. For example, the image generation system 820 may draw images using mathematical defined patterns. The mathematical defined patterns may be the same used for generating computer animation. The image generation system 820 may generate one or more parameters for drawing the images based on the analysis provided by the analysis system 810 and/or the aspects of the speech provided by the ASR system 812. In these and other embodiments, the parameters for drawing the images may include lip width, lip opening, mouth opening size, mouth movement speed, teeth showing, and tongue showing, among others.

In some embodiments, the number of parameters may be one. In these and other embodiments, the parameter may indicate a height of the mouth opening. In these and other embodiments, the height of the mouth opening may, be determined based on energy level of the audio signal. Alternately or additionally, the number of parameters may be greater than one and other characteristics of the mouth may correspond to other parameters.

In some embodiments, the generated mouth image may be a schematic representation such as an oval or other simple geometric shape. The geometric shape may respond to the audio signal by varying in shape in a particular manner based on a corresponding feature of the audio signal. For example, the geometric shape may vary in height and width depending on audio features such as loudness and spectral content. In some embodiments, the mouth image may be a cartoon image and may, for example, include regions of uniform color and shading and with distinct outlines determined using edge detection, such as a sketch of a pair of lips with a solid red or pink shade.

In some embodiments, the image generation system 820 may draw mouth images with differences to create movement of the mouth images as images are presented in sequential form. For example, the image generation system 820 may generate ten, fifteen, twenty, or thirty mouth images per second with differences therebetween such that when presented sequentially, the mouth images reflect mouth movements. Alternately or additionally, the image generation system 820 may generate fewer mouth images based on the analysis provided by the analysis system 810 and/or the aspects of the speech provided by the ASR system 812 and interpolate between the generated mouth images to generate sufficient number of mouth images to reflect mouth movement.

In some embodiments, the image generation system 820 may generate the images using generative neural networks. In these and other embodiments, the neural network may be generated based on the analysis provided by the analysis system 810 and/or the aspects of the speech provided by the ASR system 812 and images of mouths and/or mouth movements that correspond with the analysis and/or aspects of speech. In these and other embodiments, the image generation system 820 may provide the analysis and/or aspects of speech to the neural network. The neural network may generate the images accordingly.

In some embodiments, synthesizing images by the image generation system 820 may include the image generation system 820 selecting images of human mouths mimicking mouth movements that may produce the speech of the audio from a database of images of human mouths. In these and other embodiments, the image generation system 820 may select the images and/or the sequence of the images based on the analysis provided by the analysis system 810 and/or the aspects of the speech provided by the ASR system 812. In some embodiments, the image generation system 820 may be configured to interpolate the images to construct a smoother transition between the selected images when the images are presented to illustrate movement of a mouth.

For example, in some embodiments, the image generation system 820 may have access to multiple sets of images of human mouths mimicking mouth movements. The set of images may be stored in a database. Each of the sets of images may be associated with particular analysis and/or aspects of speech of audio. In these and other embodiments, when the particular analysis and/or aspects of speech is identified by the image generation system 820, the image generation system 820 may select the set of images that is associated with the particular analysis and/or aspects of speech. In these and other embodiments, the image generation system 820 may select the set of images using a selection method that employs a dynamic programming method such as a Viterbi search.

In these and other embodiments, the image generation system 820 may concatenate multiple sets of the images sequential to reflect mouth movement. In some embodiments, the image generation system 820 may select the set of images based on the current audio and/or previous audio. Alternately or additionally, the image generation system 820 may select the set of images based on future audio. For example, the image generation system 820 may select images from time T based on audio at time T, time T−t, and time T+t, where t may be a unit of time. Based on the speed of presentation of the images, in some embodiments, the image generation system 820 may remove or duplicate images in the set during presentation of the images to reflect mouth movement.

Various examples regarding how the image generation system 820 may select images and/or determine parameters for animating a human mouth are now provided.

In some embodiments, the image generation system 820 may be configured to select images and/or determine parameters for animating a human mouth using a classifier. The classifier may obtain information about the energy of the audio from the analysis system 810. The classifier may classify the energy of the audio into multiple categories. For example, the energy may be classified as low, medium, or high energy based on an analysis of typical energy levels of human speech. Based on the classification of the energy, the classifier may select an image or determine parameters associated with the energy classification. For example, an image of a closed mouth may be associated with low energy, an image of a partially-open mouth may be associated with medium energy, and an image of a wide-open mouth may be associated with high energy. In these and other embodiments, the image generation system 820 may select parameters associated with closed, partially-open, and wide-open mouths and animate mouth movements appropriately.

In some embodiments, additional information may be used by the image generation system 820 to select images and/or determine parameters for animating a human mouth. For example, the opening size of the mouth may be based on the energy as described above. Alternately or additionally, a width of the mouth may be determined based on energy of first frequencies of the audio as compared to energy of second frequencies of the audio. For example, the corners of the mouth may be drawn in for sounds where the ratio of energy above a particular frequency to energy below the particular frequency is below a threshold. In these and other embodiments, the corners of the mouth may be extended for sounds where the ratio of energy above the particular frequency to energy below the particular frequency is above the threshold.

In some embodiments, the image generation system 820 may use information from the ASR system 812 to synthesize images. For example, the ASR system 812 may be configured to provide aspects of the speech provided by the ASR system 812. In particular, the ASR system 812 may be configured to provide phoneme sounds of the speech. The image generation system 820 may include one or more images that correspond with a single phoneme sound or a sequence of phoneme sounds or instructions regarding how to draw mouth movements that correspond to a single phoneme sound or a sequence of phoneme sounds. In response to obtaining an indication of one or more phoneme sounds, the image generation system 820 may select one or more image for the one or more phoneme sounds or draw mouth movements that correspond to the one or more phoneme sounds.

In some embodiments, the image generation system 820 may estimate a mouth shape for the mouth movement based on the analysis of the audio. Based on the estimated mouth shape, the image generation system 820 may select one or more images or draw mouth movements that correspond to the mouth shape. In these and other embodiments, the image generation system 820 may estimate the mouth shape based on the spectral features determined during the analysis of the audio. The image generation system 820 may provide the spectral features to a machine learning model, such as a neural network, a sequence model, or a sequence-to-sequence model. The model may output the estimated mouth shape. In these and other embodiments, the image generation system 820 may use current, previous, or future spectral features of the audio to estimate the mouth shape. In these and other embodiments, the model may account for co-articulation and the probability of position sequences when estimating the mouth shape. In some embodiments, the image generation system 820 may use a machine learning method such as a support vector machine, neural network, linear discriminant analysis, linear regression or logistic regression, among other machine learning methods.

As described, the synthesized images generated by the image generation system 820 may include images of mouths. Alternately or additionally, the synthesized images may include other facial features. For example, the synthesized images may include teeth, tongue, eyes, noise, eyebrows, checks, chin, among other facial features. One or more facial features may be modified to reflect emphasis and emotion determined from the audio. Alternately or additionally, the synthesized images may include a head, torso, or other aspects of a human body. In these and other embodiments, the facial features or other aspects of the human body may be used to indicate emotion, emphasis, and/or speech cadence. For example, emphasized words (which may be determined, for example, using emphasis detection or simply by selecting words where the pitch increases above a selected threshold) may be punctuated with synchronized head, arm, and/or hand motion.

The image generation system 820 may be configured to provide the synthesized images to the display 830. The display 830 may obtain the synthesized images and be configured to present the synthesized images. In some embodiments, the synthesized images may be provided such that the presentation of the synthesized images appear in video form, such as images with a frame rate of thirteen frames per second or higher. In some embodiments, the synthesized images may be provided such that the presentation of the synthesized images appear sequentially in form such as images with a frame rate of twelve or less.

In some embodiments, additional data may be presented by the display 830 along with the synthesized images. For example, the display 830 may be configured to present transcriptions of the audio. In these and other embodiments, the images may appear semi-transparent and float over text of the transcription or vice-versa. Alternately or additionally, the additional data may include an indication of gender of the speaker of the audio or an identity of the speaker of the audio.

In some embodiments, the generation and presentation of the synthesized images may be controlled by a user of the device 800. For example, the example mouth image presentation device 800 may have controls to allow a user to turn the presentation of the synthesized images on or off, adjust the parameters of the images, such as the mouth size and position, gender, age, and/or ethnicity of the mouth images, and a delay of the delay 802, among other aspects.

In some embodiments, a type of the synthesized images may be controlled based on a person generating the speech in the audio provided to the device 800. For example, the device 800 may identify that a communication session is occurring with a particular device associated with a particular person. Based on this information, the device 800 may determine that the particular person is speaker. Based on the particular person, the image generation system 820 may synthesize images that are associated with the person. The synthesized images may be customizable to include particular features of the person. For example, the synthesized images may be selected to include a particular age; eye, skin, and/or hair color; gender; facial hair; among other features of a human.

In some embodiments, the image generation system 820 may adjust the features of a human in the synthesized images automatically based on information from the audio. For example, based on detected accent, the image generation system 820 may adjust the synthesized images to include a particular ethnicity associated with the detected accent.

As another example, based on the average pitch, a gender or age determination of the person generating the speech of the audio may be determined and the synthesized images may be adjusted accordingly. Thus, the synthesized images may change during a communication session based on the information from the audio. For example, the synthesized images may be of a young Hispanic girl when the speech of audio determines that a young Hispanic girl is speaking and change to images of an older Scottish gentleman when the speech of audio determines that an older Scottish gentleman is speaking.

In some embodiments, the image generation system 820 may also be configured to adjust the synthesized images based on a sentiment or emotion of the person generating the speech of the audio. For example, the mouth movement may be wider or more exaggerated for loud speech. The facial expression may appear sad, happy, raised eyebrows for a question, angry, etc., based on the detected emotion of the person from the audio.

In some embodiments, the delay 802 may be configured to delay the audio from being provided to the speaker 804 for presentation. An amount of the delay may be based on an amount of time used by the device 800 to synthesize the images. In these and other embodiments, the delay 802 may shift the audio back in time, that is delay the audio, to compensate for the processing delay performed by the image generation system 820 to synthesize the images. The delay may result in better synchronization of the presentation of the audio by the speaker 804 and the images of the mouth presented by the display 830. The speaker 804 may be configured to present audio. In these and other embodiments, presenting the audio may include broadcasting the audio by converting the audio from an electrical signal in the analog domain to acoustic energy that is transmitted through the air.

An example of the operation of the device 800 follows. The device 800 obtains audio from a communication session with a third party. A user of the device 800 enables the device 800 to present mouth images during the communication session. The device 800 provides the audio to the ASR system 812 and the delay 802. The ASR system 812 determines the phonemes of speech of the third party in the audio. The ASR system 812 provides the phonemes to the image generation system 820. The image generation system 820 uses the phonemes to select a set of images that correspond to the phoneme. The image generation system 820 provides the set of images to the display 830 for presentation. The delay 802 delays the audio for the duration of the processing performed by the image generation system 820. The delay 802 provides the audio to the speaker 804 after the delay. The speaker 804 presents the audio such that the audio is synchronized or substantial synchronized with the images such that the images include mouth movements that appear to generate the speech of the audio. Presenting the images may assist the user of the device 800 to better understand the audio presented by the speaker 804.

Modifications, additions, or omissions may be made to the device 800 and/or the components operating in the device 800 without departing from the scope of the present disclosure. For example, in some embodiments, the images may not be images of a mouth. For example, the images may take other forms, include, the images may be of a shape or pattern such as a circle or oval. In these and other embodiments, the shape may change in response to the audio. For example, a color of the shape may represent pitch, width and height of the shape may represent the phoneme, and line thickness or brightness of the shape may represent loudness. As another example, the image may include a time-domain speech waveform, where the vertical dimension represents amplitude and the horizontal represents time. Alternately or additionally, as another example, the audio may include a spectrogram, where the horizontal axis represents time, the vertical axis represents frequency, and the color or brightness represents energy levels.

Figure 9:
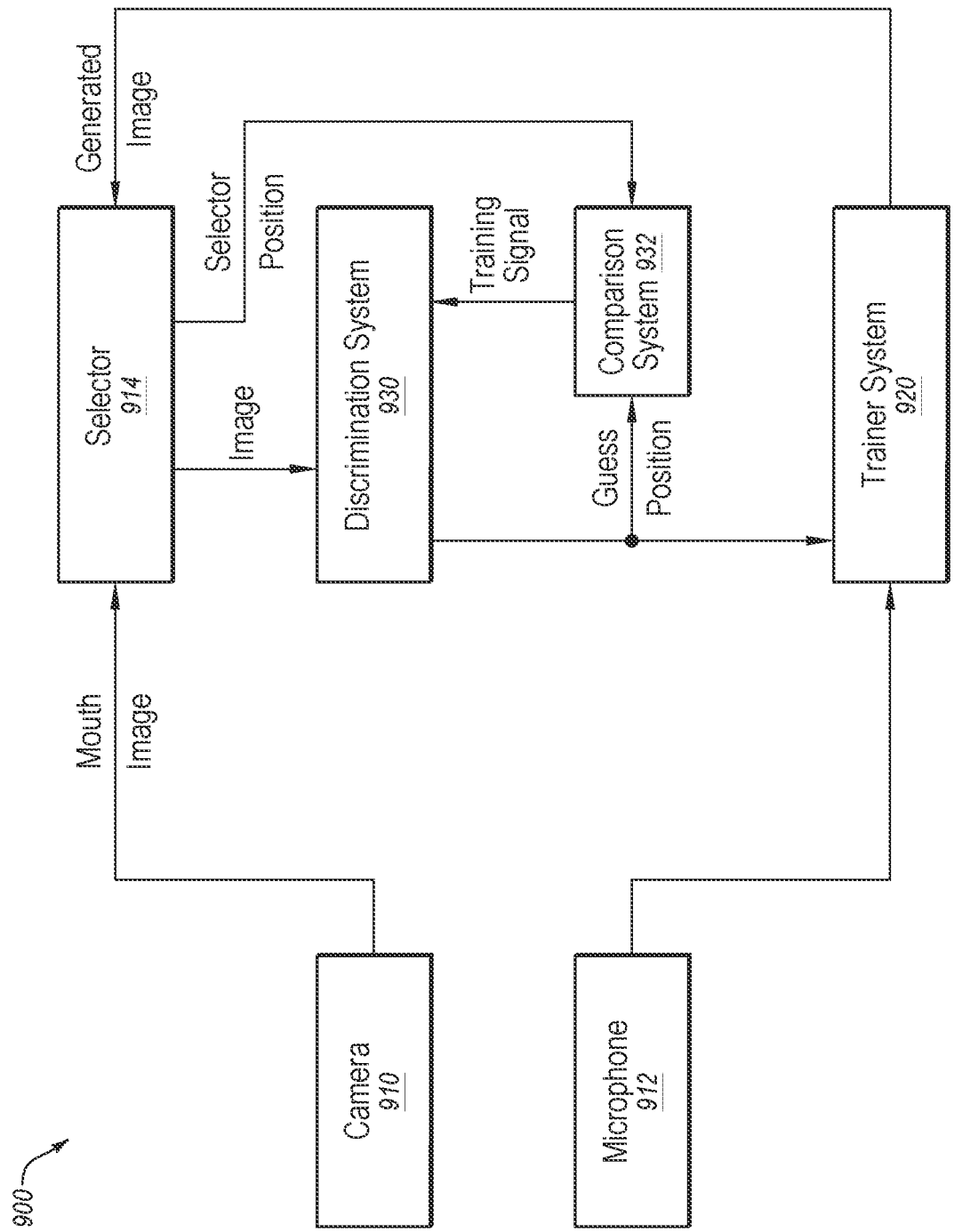
FIG. 9 illustrates an example environment for mouth image generation.

FIG. 9 illustrates an example environment 900 for mouth image generation. The environment 900 may be arranged in accordance with at least one embodiment described in the present disclosure. The environment 900 may include a camera 910, a microphone 912, a selector 914, a trainer system 920, a discrimination system 930, and a comparison system 932. The environment 900 may be an example of an environment that may be used to generate a machine learning model, such as a neural network, that may be used by an image generation system, such as the image generation system 820 of FIG. 8, to synthesize images of mouth movement based on an analysis of audio.

The camera 910 may be configured to capture images that include mouth movement as the speaker speaks. The images may be in the form of video or individual images. The camera 910 may provide the images to the selector 914. The microphone 912 may be configured to capture speech of the speaker to generate audio that includes the speech of the speaker. The microphone 912 may be configured to provide the audio to the trainer system 920.

In some embodiments, the audio and the images may be generated in substantially overlapping time periods and the audio may be based on a first speaker and the images may be based on the same first speaker. In some embodiments, images may be captured of a first speaker, a first audio sample may be based on the first speaker and a second audio sample may be based on a second speaker. The microphone 912 and camera 910 may be configured so that the images and the first audio sample are synchronized such that an image is associated with a segment or point in time in the first audio sample. The images and the second audio sample may also be synchronized so that an image is associated with a segment or point in time of the second audio sample that corresponds to the image. The image and second audio sample may be synchronized by comparing a segment of the first audio sample and a segment of the second audio sample and determining a time alignment between the two segments where the audio content is similar. An image that corresponds to the segment of the first audio sample may be determined to correspond to the segment of the second audio sample. For example, the first and second audio samples may be analyzed to determine a set of spectral coefficients or other features for each segment of audio. A first set of features may be determined for a first segment in the first audio sample and a second set of features may be determined for a second segment of the second audio. The first set of features may be compared to the second set of features to determine how closely the first segment matches the second segment. Using the features, a time alignment method such as dynamic time warping may be used to determine a first series of segments in the first audio sample that match a second series of segments in the second audio sample. A location in the second series of segments in the second audio sample may be determined to correspond to an image based on the image corresponding to the location in the first series of segments in the first audio sample. The time alignment between the image and the second audio sample may be used by the trainer system 920 to learn a relationship between the images of the first speaker and the audio of the second speaker. In these and other embodiments, the trainer system 920 may use images from a first speaker with audio from multiple speakers for training.

In some embodiments, multiple audio samples may be created by modifying the first audio sample used by the trainer system 920. For example, the first audio sample may be filtered, slowed down, sped up, quantized, compressed and decompressed, distorted, processed with frequency translation, or otherwise altered. In some embodiments, the trainer system 920 may use audio and images from multiple speakers, where the images from different speakers are modified to look similar to each other, for example by adjusting dimensions, color shading, and other mouth features or by using images morphing software.

The trainer system 920 may be configured to obtain the audio from the microphone 912. Additionally or alternatively, the trainer system 920 may be configured to obtain one or more randomly-generated inputs such as noise signals. The trainer system 920 may be configured to generate images of a mouth that mimics movement of a mouth to generate the speech in the audio. The trainer system 920 may provide the generated images to the selector 914. In these and other embodiments, the trainer system 920 may be configured to generate the images based on an analysis of the audio from the microphone 912. Alternately or additionally, additional data may be used by the trainer system 920 to generate the images. For example, the additional data may include outputs from an ASR system, parameters such as a gender, identity, and/or age, of the speaker, preferences set by the subscriber or speaker, and an estimated emotional state, among other data. Alternately or additionally, the trainer system 920 may select images of human mouths, which when presented sequentially at a particular frame rate analogous to the frame rate of the camera, may resemble images of the mouth captured by the camera 910.

The selector 914 may obtain the images from the camera 910 and the generated images from the trainer system 920. The selector 914 may be configured to select the images from the camera 910 or the generated images to provide to the discrimination system 930. The images from the camera 910 and the generated image selected by the selector 914 may be referred to as the selected images. In some embodiments, the selector 914 may randomly select the selected images to send to the discrimination system 930. Alternately or additionally, the selector 914 may select the selected images based on some non-random schedule. The selector 914 may provide the selected images to the discrimination system 930.

In some embodiments, the selector 914 may also provide an indication of the images that are being selected by the comparison system 932. For example, the selector 914 may indicate that the selected images are from the trainer system 920 or from the camera 910.

The discrimination system 930 may be configured to determine if the selected images are from the trainer system 920 or from the camera 910. The discrimination system 930 may provide the determination to the comparison system 932 and to the trainer system 920.

The comparison system 932 may be configured to obtain the indication of the images being selected from the selector 914 and the determination from the discrimination system 930 regarding whether the selected images are from the camera 910 or from the trainer system 920. The comparison system 932 may compare the indication from the selector 914 to the determination from the discrimination system 930. The comparison system 932 may provide a training signal to the discrimination system 930 that indicates to the discrimination system 930 if the determination made by the discrimination system 930 is correct. In other words, the comparison system 932 may indicate to the discrimination system 930 whether the discrimination system 930 accurately determined if the selected images are from the trainer system 920 or from the camera 910.

In some embodiments, the discrimination system 930 and the trainer system 920 may be neural networks, including neural networks with LSTM layers, convolutional layers, feed-forward layers, dilated connections, and gated recurrent unit (GRU) layers, among other types of neural networks. Alternately or additionally, the discrimination system 930 and the trainer system 920 may be other types of machine learning models.

In some embodiments, the environment 900 may be configured to train the discrimination system 930 and/or the trainer system 920. In some embodiments, the discrimination system 930 may be trained in overlapping time periods with the training of the trainer system 920. Alternately or additionally, one of the discrimination system 930 and the trainer system 920 may be trained initially and then the other of the discrimination system 930 and the trainer system 920 may be trained.

In some embodiments, based on the training signal from the comparison system 932, the discrimination system 930 may be trained to distinguish between the images from the camera 910 and the generated images. In some embodiments, the trainer system 920 may obtain the determination from the discrimination system 930. The trainer system 920 may be configured to be trained to generate the images determined by the discrimination system 930. The process of training the trainer system 920 may generate a set of training parameters such as neural network weights. The trainer system 920 may provide the training parameters to the image generation system 820 to be used for generating images.

Modifications, additions, or omissions may be made to the environment 900 and/or the components operating in the environment 900 without departing from the scope of the present disclosure. For example, in some embodiments, the environment 900 may not include the camera 910. In these and other embodiments, images of mouth movement that corresponds to the audio generated by the microphone may be provided to the selector 914. Alternately or additionally, other data, such as instructions to draw animations of the mouth may be provided to the selector 914. In these and other embodiments, the trainer system 920 may be configured to generate instructions to draw animations of the mouth. In short, the type of data provided to the selector 914 may be the type of data generated by the trainer system 920.

In some embodiments, the environment 900 may not include the selector 914, the discrimination system 930, and the comparison system 932. In these and other embodiments, the camera 910 may provide images to the trainer system 920 and the trainer system 920 may determine parameters for generating images from audio. The parameters may be weights for one or more neural networks, a set of rules for mapping audio to images, weights for an estimator based on linear regression or logistic regression, parameters for a support vector machine, parameters and/or rules for selecting one or more images based on audio input, or parameters for another type of classifier, estimator, or selector. The parameters may be used by the image generation system 820 to generate images from audio.

As another example, in some embodiments, the environment 900 may not include the microphone 912. In these and other embodiments, recorded audio may be provided to the trainer system 920. In these and other embodiments, the recorded audio may include speech and the recorded audio may be analyzed to obtain the analysis of the speech and/or aspects of the speech. In these and other embodiments, the analysis of the speech and/or aspects of the speech may be provided to the trainer system 920. In some embodiments, the recorded audio may be analyzed in real-time as the recorded audio is provided to the trainer system 920.

Figure 10:
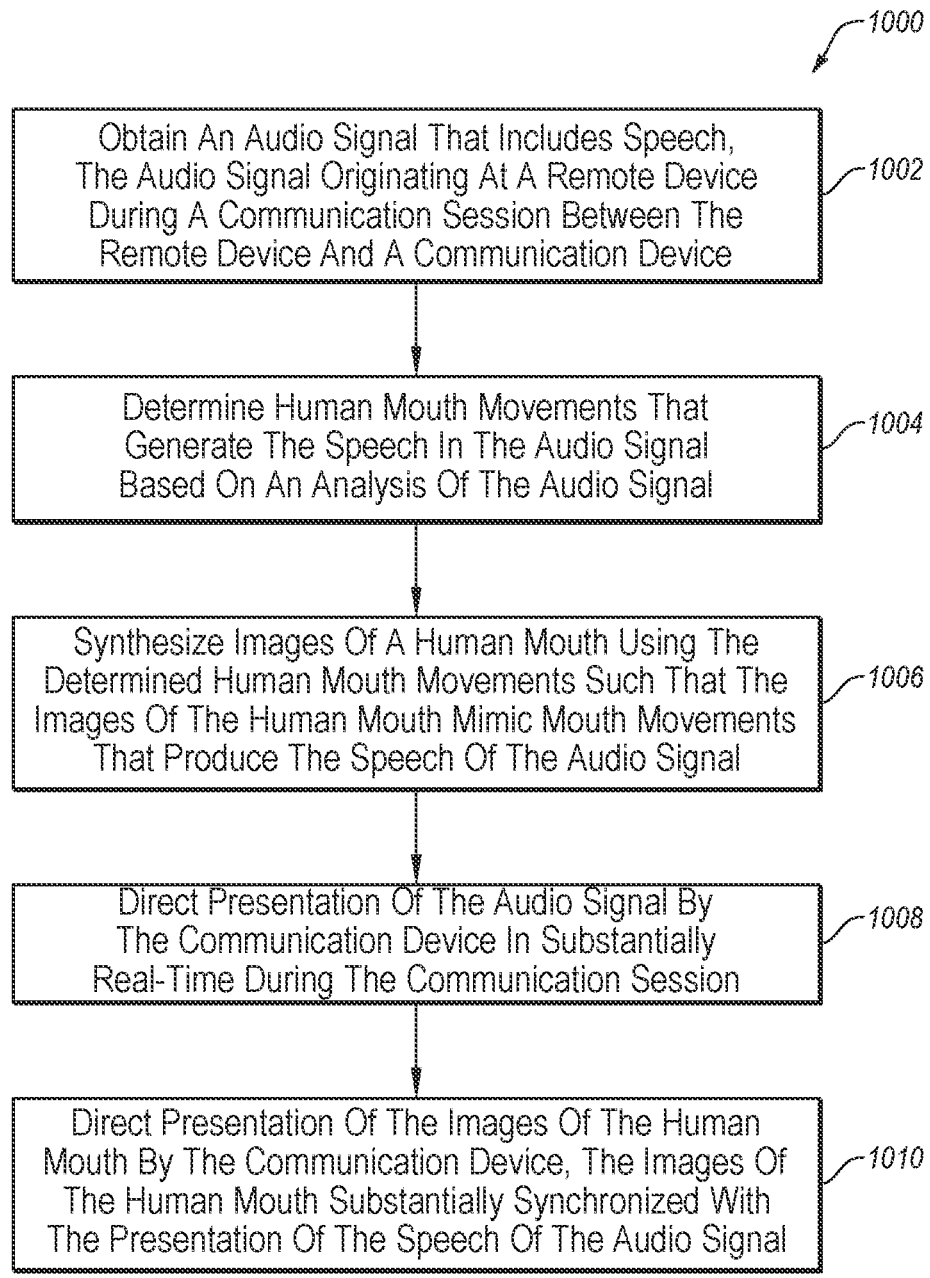
FIG. 10 is a flowchart of an example method to present images of a mouth.

FIG. 10 is a flowchart of an example method 1000 to present images of a mouth. The method 1000 may be arranged in accordance with at least one embodiment described in the present disclosure. One or more of the operations of the method 1000 may be performed, in some embodiments, by a device or system, such as the first device 112 of FIG. 1, the first device 230 of FIG. 2, the first device 612 of FIG. 6, the device 800 of FIG. 8, or any other suitable another device or system described in this disclosure. In these and other embodiments, the method 1000 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 1000 may begin at block 1002, where an audio signal that includes speech may be obtained. In some embodiments, the audio signal may originate at a remote device during a communication session between the remote device and a communication device.

At block 1004, human mouth movements that generate the speech in the audio signal may be determined based on an analysis of the audio signal. In some embodiments, the analysis of the audio signal may include determining one or more of: energy of the audio signal, spectral features of the audio signal, text of the speech of the audio signal, and phonemes in the audio signal, among other data regarding the audio signal.

At block 1006, images that include a human mouth may be synthesized using the determined human mouth movements such that the images that include the human mouth mimic mouth movements that produce the speech of the audio signal. In some embodiments, synthesizing images of a human mouth may include selecting one or more images from multiple mouth images that correspond with the determined human mouth movements. Alternately or additionally, synthesizing images of a human mouth may include drawing one or more images based on instructions that correspond with the determined human mouth movements.

At block 1008, presentation of the audio signal may be directed by the communication device in substantially real-time during the communication session. At block 1010, presentation of the images that include the human mouth may be directed by the communication device. In these and other embodiments, the images that include the human mouth may be substantially synchronized with the presentation of the speech of the audio signal. In some embodiments, the images that include the human mouth may include lips, teeth, and/or a tongue. Alternately or additionally, the images that include the human mouth may include images of a human head that includes the human mouth.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 1000 may further include obtaining a transcription of the speech of the audio signal and directing presentation of the transcription by the communication device such that the transcription is substantially aligned with the presentation of the audio signal.

Figure 11:
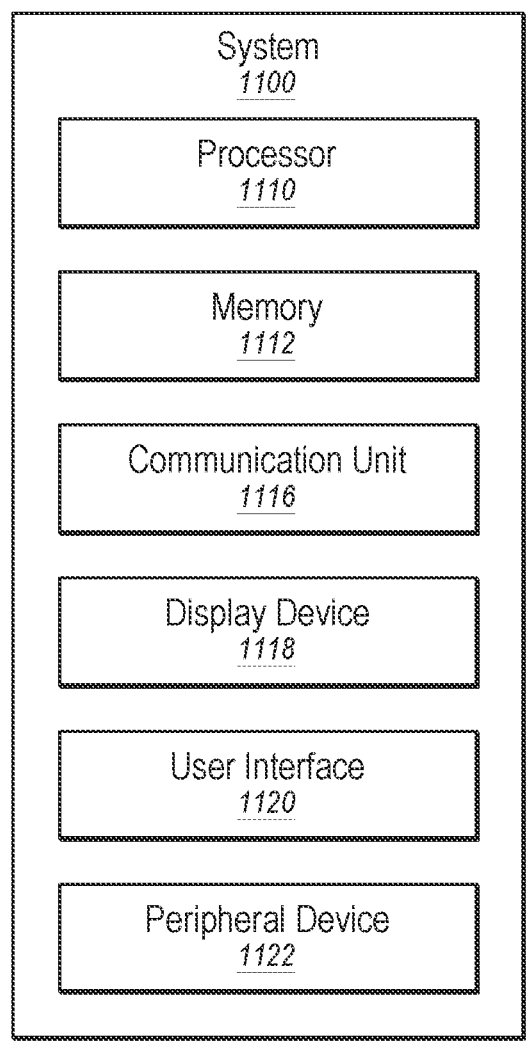
FIG. 11 illustrates an example system used for hearing accommodation.

FIG. 11 illustrates an example system used for hearing accommodation as described in this disclosure. The system 1100 may include a processor 1110, memory 1112, a communication unit 1116, a display device 1118, a user interface unit 1120, and a peripheral device 1122, which all may be communicatively coupled. In some embodiments, the system 1100 may be part of any of the systems or devices described in this disclosure.

For example, the system 1100 may be part of the environment 100 of FIG. 1 and may be configured to perform one or more of the tasks described above with respect to the first device 112 or the transcription system 130. As another example, the system 1100 may be part of the environment of FIG. 2 and may be configured to perform one or more of the tasks described above with respect to the first device 230. As another example, the system 1100 may be part of the system 500 of FIG. 5 and may be configured to perform one or more of the tasks described above with respect to the system 500.

As another example, the system 1100 may be part of the environment 600 of FIG. 6 and may be configured to perform one or more of the tasks described above with respect to the first device 612 or the transcription system 630. As another example, the system 1100 may be part of the device 800 of FIG. 8 and may be configured to perform one or more of the tasks described above with respect to the device 800. As another example, the system 1100 may be part of the environment 900 of FIG. 9 and may be configured to perform one or more of the tasks described above with respect to the elements of the environment 900.

Generally, the processor 1110 may include any suitable special-purpose or general-purpose computer, computing entity, or processing device including various computer hardware or software modules and may be configured to execute instructions stored on any applicable computer-readable storage media. For example, the processor 1110 may include a microprocessor, a microcontroller, a parallel computing array such as a single instruction multiple data (SIMD) processor, a vector processor, a graphics processing unit (GPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 11, it is understood that the processor 1110 may include any number of processors distributed across any number of networks or physical locations that are configured to perform individually or collectively any number of operations described herein. In some embodiments, the processor 1110 may interpret and/or execute program instructions and/or process data stored in the memory 1112. In some embodiments, the processor 1110 may execute the program instructions stored in the memory 1112.

For example, in some embodiments, the processor 1110 may execute program instructions stored in the memory 1112 that are related to operations for generating transcriptions such that the system 1100 may perform or direct the performance of the operations associated therewith as directed by the instructions.

The memory 1112 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1110.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 1110 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 1116 may include any component, device, system, or combination thereof that is configured to transmit or receive information over a network. In some embodiments, the communication unit 1116 may communicate with other devices at other locations, the same location, or even other components within the same system. For example, the communication unit 1116 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), a telephone jack, and/or the like. The communication unit 1116 may permit data to be exchanged with a network and/or any other devices or systems described in the present disclosure.

The display device 1118 may be configured as one or more displays that present images, words, etc., like an LCD, LED, OLED, projector, or other type of display. The display device 1118 may be configured to present video, text captions, user interfaces, and other data as directed by the processor 1110. For example, when the system 1100 is included in the first device 112 of FIG. 1, the display device 1118 may be configured to present transcriptions.

The user interface unit 1120 may include any device to allow a user to interface with the system 1100. For example, the user interface unit 1120 may include a mouse, a track pad, a keyboard, buttons, and/or a touchscreen, among other devices. The user interface unit 1120 may receive input from a user and provide the input to the processor 1110. In some embodiments, the user interface unit 1120 and the display device 1118 may be combined.

The peripheral devices 1122 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may present audio received by the system 1100 or otherwise generated by the system 1100 by broadcasting the audio.

Modifications, additions, or omissions may be made to the system 1100 without departing from the scope of the present disclosure. For example, in some embodiments, the system 1100 may include any number of other components that may not be explicitly illustrated or described. Further, depending on certain implementations, the system 1100 may not include one or more of the components illustrated and described.

As indicated above, the embodiments described herein may include the use of a special purpose or general purpose computer (e.g., the processor 1110 of FIG. 11) including various computer hardware or software modules, as discussed in greater detail below. Further, as indicated above, embodiments described herein may be implemented using computer-readable media (e.g., the memory 1112 of FIG. 11) for carrying or having computer-executable instructions or data structures stored thereon.

In some embodiments, a method to adjust audio is provided. The method may comprise obtaining a first audio signal that includes speech, the first audio signal including audio distortion such as distortion caused by an audio signal being communicated over a network; obtaining a second audio signal that includes the speech, the second audio signal not including the audio distortion; adjusting the first audio signal to reduce the distortion of the first audio signal, the adjustment of the first audio signal performed using a parameter; adjusting the parameter based on a difference determined between the adjusted first audio signal and the second audio signal; and directing the adjusted parameter to a communication device, the communication device configured to obtain a third audio signal over a second network and to adjust the third audio signal using the adjusted parameter before presenting the third audio signal to a user of the communication device.

In some embodiments, the second audio signal is a revoicing of the first audio signal. In these and other embodiments, the first audio signal originates from a second communication device and is obtained from the communication device. In these and other embodiments, generating a transcript of the speech of the first audio signal using the second audio signal in substantially real-time; and directing the transcript of the speech to the communication device, the communication device configured to present the transcript in substantially real-time with the presentation of the first audio signal.

In some embodiments, the method to adjust audio may include all of the above methods to adjust audio and the first audio signal and the second audio signal originating from a voice signal that includes the speech. In some embodiments, the method to adjust audio may include all of the above methods and the second audio signal and the adjusted first audio signal are time aligned before the difference is determined between the adjusted first audio signal and the second audio signal.

In some embodiments, the method to adjust audio may include all of the above methods to adjust audio and the second audio signal and the adjusted first audio signal are transformed before the difference is determined between the adjusted first audio signal and the second audio signal. In some embodiments, the method to adjust audio may include all of the above methods to adjust audio and the audio distortion of the first audio signal is included in the first audio signal by the first audio signal being communicated over the network. In some embodiments, the method to adjust audio may include all of the above methods to adjust audio and the audio distortion of the first audio signal is included in the first audio signal by the first audio signal being applied to a network simulator. In some embodiments, at least one non-transitory computer-readable media configured to store one or more instructions that, in response to being executed by at least one processor, cause or direct a system to perform any of the above methods to adjust audio.

In some embodiments, a method to directing presentation of images that include a human mouth is provided. The method comprising obtaining an audio signal that includes speech, the audio signal originating at a remote device during a communication session between the remote device and a communication device; determining human mouth movements that generate the speech in the audio signal based on an analysis of the audio signal; synthesizing images that include a human mouth using the determined human mouth movements such that the images that include the human mouth mimic mouth movements that produce the speech of the audio signal; directing presentation of the audio signal by the communication device in substantially real-time during the communication session; and directing presentation of the images that include the human mouth by the communication device, the images that include the human mouth substantially synchronized with the presentation of the speech of the audio signal.

In some embodiments, the method to directing presentation of images of a human mouth may include all of the above methods with respect to directing presentation of images of a human mouth and the analysis of the audio signal includes determining one or more of: energy of the audio signal, spectral features of the audio signal, text of the speech of the audio signal, and phonemes in the audio signal.

In some embodiments, the method to directing presentation of images of a human mouth may include all of the above methods with respect to directing presentation of images of a human mouth and the method may also comprise obtaining a transcription of the speech of the audio signal; and directing presentation of the transcription by the communication device such that the transcription is substantially aligned with the presentation of the audio signal.

In some embodiments, the method to directing presentation of images of a human mouth may include all of the above methods with respect to directing presentation of images of a human mouth and the images of the human mouth may include lips, teeth, and/or a tongue. In some embodiments, the method to directing presentation of images of a human mouth may include all of the above methods with respect to directing presentation of images of a human mouth and the images of the human mouth includes images of a human head that includes the human mouth.

In some embodiments, the method to directing presentation of images of a human mouth may include all of the above methods with respect to directing presentation of images of a human mouth and synthesizing images of a human mouth includes selecting one or more images from a plurality of mouth images that correspond with the determined human mouth movements.

In some embodiments, the method to directing presentation of images of a human mouth may include all of the above methods with respect to directing presentation of images of a human mouth and synthesizing images of a human mouth includes drawing one or more images based on instructions that correspond with the determined human mouth movements. In some embodiments, at least one non-transitory computer-readable media configured to store one or more instructions that, in response to being executed by at least one processor, cause or direct a system to perform any of the above methods to directing presentation of images of a human mouth.

In some embodiments, the different components, methods, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

I claim:

1. A method comprising:
   obtaining a first audio signal including first speech originating at a remote device during a communication session between the remote device and a communication device;
   obtaining a second audio signal including second speech originating at the communication device during the communication session between the remote device and the communication device;
   obtaining a characteristic of the communication session from one or more of: the first audio signal, the second audio signal, and settings of the communication device;
   determining a hearing level of a user of the communication device using the characteristic of the communication session; and
   in response to the determined hearing level, adjusting a presentation provided by the communication device to the user, the presentation including a transcription of audio obtained at the device.

2. The method of claim 1, wherein the adjusting the presentation includes providing a summary of the transcription for presentation.

3. The method of claim 1, wherein the adjusting the presentation includes adjusting the transcription by changing a system used to generate the transcription of the audio.

4. The method of claim 1, further comprising generating the transcription of the audio.

5. The method of claim 1, wherein the presentation includes audio broadcast by the communication device.

6. The method of claim 1, wherein the adjusting the presentation includes presenting portions of a face on a display of the communication device, the portions of the face adjusting according to words in audio broadcast by the communication device.

7. A device comprising:
   one or more processors;
   one or more computer-readable media coupled to the one or more processors, the one or more computer-readable media configured to store instructions that when executed by the one or more processors cause the device to perform operations, the operations comprising:
      obtaining first data including first speech originating at a remote device during a communication session between the remote device and the device;
      obtaining second data of a user of the device including second speech originating at the device;
      determining a hearing level of the user of the device from one or more of: the first data, the second data, and settings of the device; and
      in response to the determined hearing level, adjusting a presentation provided by the device to the user, the presentation including a transcription of audio obtained at the device.

8. The device of claim 7, wherein the adjusting the presentation includes providing a summary of the transcription for presentation.

9. The device of claim 7, wherein the adjusting the presentation includes adjusting the transcription by directing a change in a transcription system used to generate the transcription of the audio.

10. The device of claim 7, wherein the presentation includes audio broadcast by the device.

11. The device of claim 7, wherein the adjusting the presentation includes presenting portions of a face on a display of the device, the portions of the face adjusting according to words in audio broadcast by the device.

12. A method comprising:

obtaining first data including first speech originating at a remote device during a communication session between the remote device and a communication device;

obtaining second data of a user of the communication device including second speech originating at the communication device;

determining a hearing level of the user of the communication device from one or more of: the first data, the second data, and settings of the communication device; and in response to the determined hearing level, adjusting a presentation provided by the communication device to the user including presenting portions of a face on a display of the communication device, the portions of the face adjusting according to words in audio broadcast by the communication device.

13. The method of claim 12, wherein the presentation includes a transcription of audio obtained at the communication device.

14. The method of claim 13, wherein the adjusting the presentation includes providing a summary of the transcription for presentation.

15. The method of claim 13, wherein the adjusting the presentation includes adjusting the transcription by changing a system used to generate the transcription of the audio.

16. The method of claim 13, further comprising generating the transcription of the audio.

17. The method of claim 12, wherein the presentation includes audio broadcast by the communication device.

* * * * *